(12) United States Patent
Yoshii et al.

(10) Patent No.: US 7,764,712 B2
(45) Date of Patent: Jul. 27, 2010

(54) RADIO TRANSMITTING APPARATUS, RADIO RECEIVING APPARATUS, RADIO TRANSMITTING METHOD AND RADIO RECEIVING METHOD

(75) Inventors: Isamu Yoshii, Kanagawa (JP); Tomohiro Imai, Kanagawa (JP); Alexander Golitschek Edler Von Elbwart, Darmstadt (DE); Christian Wengerter, Kleinheubach (DE)

(73) Assignee: Panasonic Corporation, Osaka (JP)

( * ) Notice: Subject to any disclaimer, the term of this patent is extended or adjusted under 35 U.S.C. 154(b) by 380 days.

(21) Appl. No.: 11/722,848

(22) PCT Filed: Dec. 26, 2005

(86) PCT No.: PCT/JP2005/023800
§ 371 (c)(1),
(2), (4) Date: Jun. 26, 2007

(87) PCT Pub. No.: WO2006/070750
PCT Pub. Date: Jul. 6, 2006

(65) Prior Publication Data
US 2007/0263666 A1    Nov. 15, 2007

(30) Foreign Application Priority Data
Dec. 27, 2004 (JP) ............... 2004-376162
Sep. 9, 2005 (JP) ............... 2005-263014

(51) Int. Cl.
*H04B 3/10* (2006.01)
(52) U.S. Cl. .............. 370/491; 375/260; 375/264
(58) Field of Classification Search .............. None
See application file for complete search history.

(56) References Cited

U.S. PATENT DOCUMENTS

| | | | |
|---|---|---|---|
| 5,717,713 A * | 2/1998 | Natali | 375/149 |
| 7,068,628 B2 | 6/2006 | Li et al. | |
| 7,099,399 B2 * | 8/2006 | McCallister | 375/269 |
| 2003/0043928 A1 * | 3/2003 | Ling et al. | 375/267 |
| 2003/0081576 A1 | 5/2003 | Kim et al. | |
| 2007/0263666 A1 * | 11/2007 | Yoshii et al. | 370/491 |
| 2008/0279308 A1 * | 11/2008 | Golitschek Edler Von Elbwart et al. | 375/308 |

(Continued)

FOREIGN PATENT DOCUMENTS

JP    2002044051    2/2002

(Continued)

OTHER PUBLICATIONS

PCT International Search Report dated Apr. 4, 2006 with English translation.

*Primary Examiner*—Chi H Pham
*Assistant Examiner*—Kouroush Mohebbi
(74) *Attorney, Agent, or Firm*—Dickinson Wright PLLC

(57) ABSTRACT

A radio transmitting apparatus and the like for improving the reception error rate characteristic. In this apparatus, a data modulating part (121) modulates a data signal to provide a modulated symbol. A Q-inverting part (125) generates a symbol that corresponds to the modulated symbol provided by the data modulating part (121) and that, when combined with the modulated symbol, becomes a signal having a particular value. A multiplexing part (110) multiplexes the modulated symbol provided by the data modulating part (121) with the corresponding symbol generated by the Q-inverting part (125) to provide a multiplexed signal.

16 Claims, 24 Drawing Sheets

U.S. PATENT DOCUMENTS

2009/0034635 A1* 2/2009 Golitschek Edler Von Elbwart et al. .......................... 375/260
2009/0034655 A1* 2/2009 Golitschek Edler Von Elbwart et al. .......................... 375/302

FOREIGN PATENT DOCUMENTS

| | | |
|---|---|---|
| JP | 2003152680 | 5/2003 |
| JP | 2003318856 | 11/2003 |
| JP | 2004159084 | 6/2004 |
| WO | 02067491 | 8/2002 |

\* cited by examiner

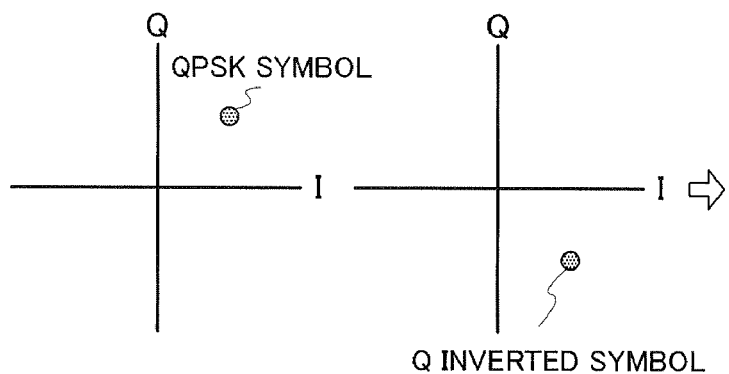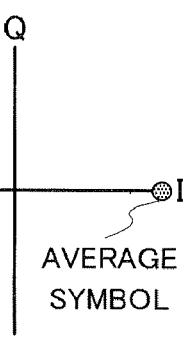
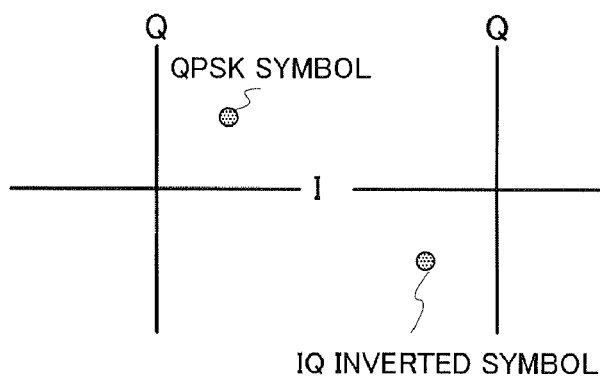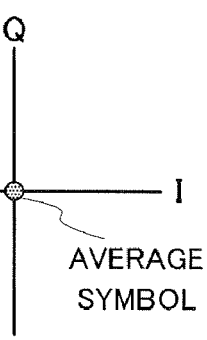

FIG.9A
|  | t1 | t2 | t3 | t4 | t5 |
|---|---|---|---|---|---|
| $f_1$ | 1 | (1,1) | (1,−1) | (−1,−1) | (−1,1) |
| $f_2$ | 0 | (−1,−1) | (1,1) | (1,−1) | (−1,1) |
FIG.9B
|  | t1 | t2 | t3 | t4 | t5 |
|---|---|---|---|---|---|
| $f_1$ | 0 | (−1,−1) | (1,1) | (1,−1) | (−1,1) |
| $f_2$ | 1 | (−1,−1) | (−1,1) | (1,1) | (1,−1) |
 
FIG.9C
|  | t1 | t2 | t3 | t4 | t5 |
|---|---|---|---|---|---|
| C(1,1) | 1+0.3j | 1+0.3j | 1+0.3j | 0.9+0.4j | 0.9+0.4j |
| C(2,1) | 0.8−0.2j | 0.8−0.2j | 0.8−0.2j | 0.5−0.2j | 0.5−0.2j |
| C(1,2) | 0.5+j | 0.5+j | 0.5+j | 0.3+j | 0.3+j |
| C(2,2) | 0.7+0.5j | 0.7+0.5j | 0.7+0.5j | 0.7+0.5j | 0.7+0.5j |
 
FIG.9D
|  | t1 | t2 | t3 | t4 | t5 |
|---|---|---|---|---|---|
| $f_1$ | (1,0.3) | (−0.3,−0.7) | (2.3,−0.1) | (−0.2,−2) | (−1.6,1.2) |
| $f_2$ | (0.8,−0.2) | (−1.7,−1.9) | (0.1,2.3) | (2,−0.2) | (−1,−0.2) |
FIG.9E
|  | t1 | t2 | t3 | t4 | t5 |
|---|---|---|---|---|---|
| $f_1$ | (0.5,1) | (−0.7,0.3) | (1.7,1.7) | (1.9,−1.5) | (−2.5,−0.5) |
| $f_2$ | (0.7,0.5) | (0.3,−2.7) | (−1.7,1.7) | (1.5,1.9) | (−0.1,−0.9) |
 
FIG.9F
|  | t1 | t2−t3 | t4−t5 |
|---|---|---|---|
| $f_1$ | (1, 0.3) | (1, 0.3) | (−0.9, −0.4) |
| $f_2$ | (0.8, −0.2) | (−0.8, 0.2) | (0.5, −0.2) |
FIG.9G
|  | t1 | t2−t3 | t4−t5 |
|---|---|---|---|
| $f_1$ | (0.5, 1) | (0.5, 1) | (−0.3, −1) |
| $f_2$ | (0.7, 0.5) | (−0.7, −0.5) | (0.7, 0.5) |
FIG.9H
|  | t1 | t2−t3 | t4−t5 |
|---|---|---|---|
| $f_1$ | (1, 0.3) | (1, 0.3) | (−0.9, −0.4) |
| $f_1$ |  | (−1, −0.3) | (0.9, 0.4) |
| $f_2$ | (0.8 −0.2) | (−0.8, 0.2) | (0.5, −0.2) |
| $f_2$ |  | (0.8, −0.2) | (−0.5, 0.2) |
FIG.9I
|  | t1 | t2−t3 | t4−t5 |
|---|---|---|---|
| $f_1$ | (0.5, 1) | (0.5, 1) | (−0.3, −1) |
| $f_1$ |  | (−0.5, −1) | (0.3, 1) |
| $f_2$ | (0.7, 0.5) | (−0.7, −0.5) | (0.7, 0.5) |
| $f_2$ |  | (0.7, 0.5) | (−0.7, −0.5) |

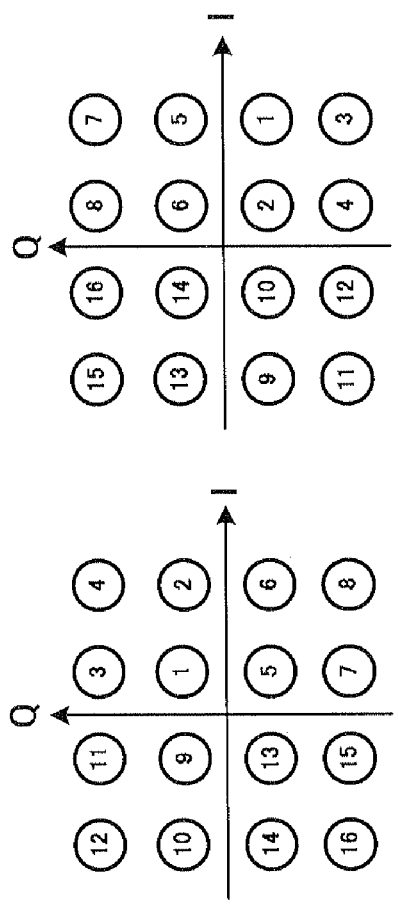
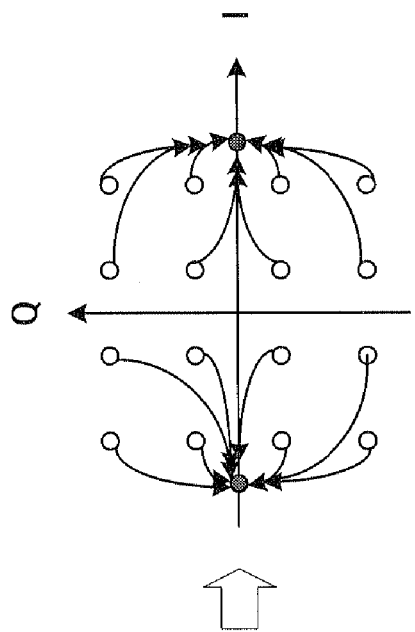
FIG.12A  FIG.12B  FIG.12C

| SYMBOL NUMBER | MODULATED DATA SYMBOL | | MAPPING CHANGE SYMBOL | | AVERAGE SYMBOL | |
|---|---|---|---|---|---|---|
| | I | Q | I | Q | I | Q |
| 1 | R | R | 3R | -R | 4R | 0 |
| 2 | 3R | R | R | -R | 4R | 0 |
| 3 | R | 3R | 3R | -3R | 4R | 0 |
| 4 | 3R | 3R | R | -3R | 4R | 0 |
| 5 | R | -R | 3R | R | 4R | 0 |
| 6 | 3R | -R | R | R | 4R | 0 |
| 7 | R | -3R | 3R | 3R | 4R | 0 |
| 8 | 3R | -3R | R | 3R | 4R | 0 |
| 9 | -R | R | -3R | R | -4R | 0 |
| 10 | -3R | R | -R | R | -4R | 0 |
| 11 | -R | 3R | -3R | 3R | -4R | 0 |
| 12 | -3R | 3R | -R | 3R | -4R | 0 |
| 13 | -R | -R | -3R | R | -4R | 0 |
| 14 | -3R | -R | -R | R | -4R | 0 |
| 15 | R | -3R | -3R | 3R | -4R | 0 |
| 16 | 3R | -3R | -R | 3R | -4R | 0 |

| SYMBOL NUMBER | MODULATED DATA SYMBOL | | MAPPING CHANGE SYMBOL | | AVERAGE SYMBOL | |
|---|---|---|---|---|---|---|
| | I | Q | I | Q | I | Q |
| 1 | R1 | R1 | 7R1 | -R1 | 8R1 | 0 |
| 2 | 3R1 | R1 | 5R1 | -R1 | 8R1 | 0 |
| 3 | 5R1 | R1 | 3R1 | -R1 | 8R1 | 0 |
| 4 | 7R1 | R1 | R1 | -R1 | 8R1 | 0 |
| 5 | R1 | 3R1 | 7R1 | -3R1 | 8R1 | 0 |
| 6 | 3R1 | 3R1 | 5R1 | -3R1 | 8R1 | 0 |
| 7 | 5R1 | 3R1 | 3R1 | -3R1 | 8R1 | 0 |
| 8 | 7R1 | 3R1 | R1 | -3R1 | 8R1 | 0 |
| 9 | R1 | 5R1 | 7R1 | -5R1 | 8R1 | 0 |
| 10 | 3R1 | 5R1 | 5R1 | -5R1 | 8R1 | 0 |
| 11 | 5R1 | 5R1 | 3R1 | -5R1 | 8R1 | 0 |
| 12 | 7R1 | 5R1 | R1 | -5R1 | 8R1 | 0 |
| 13 | R1 | 7R1 | 7R1 | -7R1 | 8R1 | 0 |
| 14 | 3R1 | 7R1 | 5R1 | -7R1 | 8R1 | 0 |
| 15 | 5R1 | 7R1 | 3R1 | -7R1 | 8R1 | 0 |
| 16 | 7R1 | 7R1 | R1 | -7R1 | 8R1 | 0 |
| 17 | R1 | -R1 | 7R1 | R1 | 8R1 | 0 |
| 18 | 3R1 | -R1 | 5R1 | R1 | 8R1 | 0 |
| 19 | 5R1 | -R1 | 3R1 | R1 | 8R1 | 0 |
| 20 | 7R1 | -R1 | R1 | R1 | 8R1 | 0 |
| 21 | R1 | -3R1 | 7R1 | 3R1 | 8R1 | 0 |
| 22 | 3R1 | -3R1 | 5R1 | 3R1 | 8R1 | 0 |
| 23 | 5R1 | -3R1 | 3R1 | 3R1 | 8R1 | 0 |
| 24 | 7R1 | -3R1 | R1 | 3R1 | 8R1 | 0 |
| 25 | R1 | -5R1 | 7R1 | 5R1 | 8R1 | 0 |
| 26 | 3R1 | -5R1 | 5R1 | 5R1 | 8R1 | 0 |
| 27 | 5R1 | -5R1 | 3R1 | 5R1 | 8R1 | 0 |
| 28 | 7R1 | -5R1 | R1 | 5R1 | 8R1 | 0 |
| 29 | R1 | -7R1 | 7R1 | 7R1 | 8R1 | 0 |
| 30 | 3R1 | -7R1 | 5R1 | 7R1 | 8R1 | 0 |
| 31 | 5R1 | -7R1 | 3R1 | 7R1 | 8R1 | 0 |
| 32 | 7R1 | -7R1 | R1 | 7R1 | 8R1 | 0 |
| 33 | -R1 | R1 | -7R1 | -R1 | -8R1 | 0 |
| 34 | -3R1 | R1 | -5R1 | -R1 | -8R1 | 0 |
| 35 | -5R1 | R1 | -3R1 | -R1 | -8R1 | 0 |
| 36 | -7R1 | R1 | -R1 | -R1 | -8R1 | 0 |
| 37 | -R1 | 3R1 | -7R1 | -3R1 | -8R1 | 0 |
| 38 | -3R1 | 3R1 | -5R1 | -3R1 | -8R1 | 0 |
| 39 | -5R1 | 3R1 | -3R1 | -3R1 | -8R1 | 0 |
| 40 | -7R1 | 3R1 | -R1 | -3R1 | -8R1 | 0 |
| 41 | -R1 | 5R1 | -7R1 | -5R1 | -8R1 | 0 |
| 42 | -3R1 | 5R1 | -5R1 | -5R1 | -8R1 | 0 |
| 43 | -5R1 | 5R1 | -3R1 | -5R1 | -8R1 | 0 |
| 44 | -7R1 | 5R1 | -R1 | -5R1 | -8R1 | 0 |
| 45 | -R1 | 7R1 | -7R1 | -7R1 | -8R1 | 0 |
| 46 | -3R1 | 7R1 | -5R1 | -7R1 | -8R1 | 0 |
| 47 | -5R1 | 7R1 | -3R1 | -7R1 | -8R1 | 0 |
| 48 | 7R1 | 7R1 | -R1 | -7R1 | -8R1 | 0 |
| 49 | -R1 | -R1 | -7R1 | R1 | -8R1 | 0 |
| 50 | -3R1 | -R1 | -5R1 | R1 | -8R1 | 0 |
| 51 | -5R1 | -R1 | -3R1 | R1 | -8R1 | 0 |
| 52 | -7R1 | -R1 | -R1 | R1 | -8R1 | 0 |
| 53 | -R1 | -3R1 | -7R1 | 3R1 | -8R1 | 0 |
| 54 | -3R1 | -3R1 | -5R1 | 3R1 | -8R1 | 0 |
| 55 | -5R1 | -3R1 | -3R1 | 3R1 | -8R1 | 0 |
| 56 | -7R1 | -3R1 | -R1 | 3R1 | -8R1 | 0 |
| 57 | -R1 | -5R1 | -7R1 | 5R1 | -8R1 | 0 |
| 58 | -3R1 | -5R1 | -5R1 | 5R1 | -8R1 | 0 |
| 59 | -5R1 | -5R1 | -3R1 | 5R1 | -8R1 | 0 |
| 60 | -7R1 | -5R1 | -R1 | 5R1 | -8R1 | 0 |
| 61 | -R1 | -7R1 | -7R1 | 7R1 | -8R1 | 0 |
| 62 | -3R1 | -7R1 | -5R1 | 7R1 | -8R1 | 0 |
| 63 | -5R1 | -7R1 | -3R1 | 7R1 | -8R1 | 0 |
| 64 | 7R1 | -7R1 | -R1 | 7R1 | -8R1 | 0 |

| SYMBOL NUMBER | MODULATED DATA SYMBOL | | MAPPING CHANGE SYMBOL | | AVERAGE SYMBOL | |
|---|---|---|---|---|---|---|
| | I | Q | I | Q | I | Q |
| 1 | 0.383 | 0.924 | 0.924 | -0.924 | 1.307 | 0.000 |
| 2 | 0.924 | 0.383 | 0.383 | -0.383 | 1.307 | 0.000 |
| 3 | 0.924 | -0.383 | 0.383 | 0.383 | 1.307 | 0.000 |
| 4 | 0.383 | -0.924 | 0.924 | 0.924 | 1.307 | 0.000 |
| 5 | -0.383 | -0.924 | -0.924 | 0.924 | -1.307 | 0.000 |
| 6 | -0.924 | -0.383 | -0.383 | 0.383 | -1.307 | 0.000 |
| 7 | -0.924 | 0.383 | -0.383 | -0.383 | -1.307 | 0.000 |
| 8 | -0.383 | 0.924 | -0.924 | -0.924 | -1.307 | 0.000 |

FIG.18

| SYMBOL NUMBER | MODULATED DATA SYMBOL | | MAPPING CHANGE SYMBOL | | AVERAGE SYMBOL | |
|---|---|---|---|---|---|---|
| | I | Q | I | Q | I | Q |
| 1 | 0.195 | 0.981 | 0.981 | -0.98079 | 1.176 | 0.000 |
| 2 | 0.556 | 0.831 | 0.83147 | -0.83147 | 1.387 | 0.000 |
| 3 | 0.831 | 0.556 | 0.55557 | -0.55557 | 1.387 | 0.000 |
| 4 | 0.981 | 0.195 | 0.19509 | -0.19509 | 1.176 | 0.000 |
| 5 | 0.981 | -0.195 | 0.19509 | 0.19509 | 1.176 | 0.000 |
| 6 | 0.831 | -0.556 | 0.55557 | 0.55557 | 1.387 | 0.000 |
| 7 | 0.556 | -0.831 | 0.83147 | 0.83147 | 1.387 | 0.000 |
| 8 | 0.195 | -0.981 | 0.980785 | 0.980785 | 1.176 | 0.000 |
| 9 | -0.195 | -0.981 | -0.98079 | 0.980785 | -1.176 | 0.000 |
| 10 | -0.556 | -0.831 | -0.83147 | 0.83147 | -1.387 | 0.000 |
| 11 | -0.831 | -0.556 | -0.55557 | 0.55557 | -1.387 | 0.000 |
| 12 | -0.981 | -0.195 | -0.19509 | 0.19509 | -1.176 | 0.000 |
| 13 | -0.981 | 0.195 | -0.19509 | -0.19509 | -1.176 | 0.000 |
| 14 | -0.831 | 0.556 | -0.55557 | -0.55557 | -1.387 | 0.000 |
| 15 | -0.556 | 0.831 | -0.83147 | -0.83147 | -1.387 | 0.000 |
| 16 | -0.195 | 0.981 | -0.98079 | -0.98079 | -1.176 | 0.000 |

FIG.20

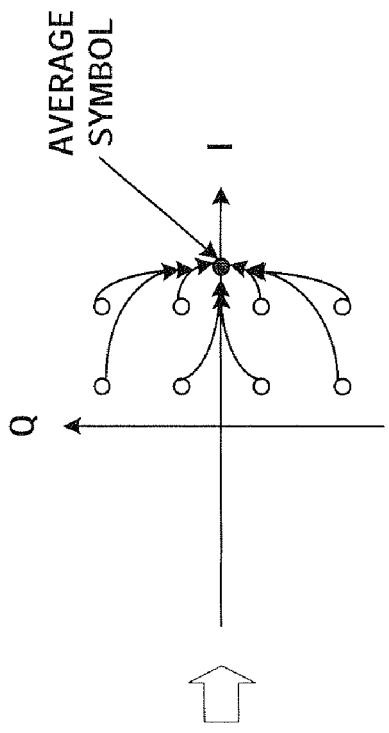
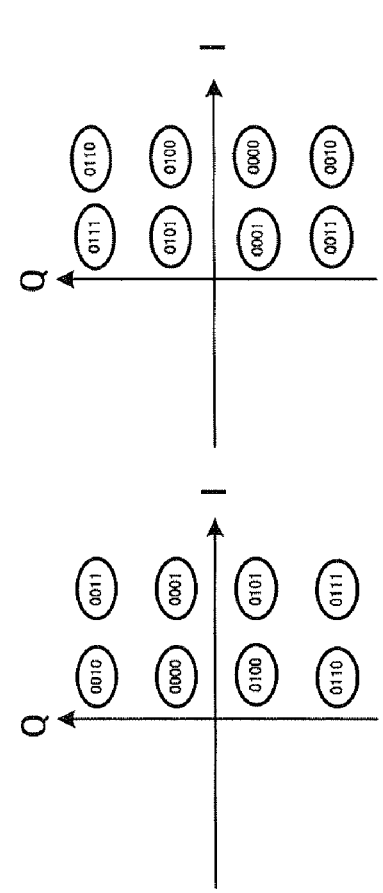

| SYMBOL NUMBER | LABEL | MODULATED DATA SYMBOL | | MAPPING CHANGE SYMBOL | | AVERAGE SYMBOL | |
|---|---|---|---|---|---|---|---|
| | | I | Q | I | Q | I | O |
| 1 | 0000 | R | R | 3R | | | O |
| 2 | 0001 | 3R | R | R | -R | 4R | 0 |
| 3 | 0010 | R | 3R | 3R | -R | 4R | 0 |
| 4 | 0011 | 3R | 3R | R | -3R | 4R | 0 |
| 5 | 0100 | R | -R | 3R | -3R | 4R | 0 |
| 6 | 0101 | 3R | -R | R | R | 4R | 0 |
| 7 | 0110 | R | -3R | 3R | R | 4R | 0 |
| 8 | 0111 | 3R | -3R | R | 3R | 4R | 0 |

| SYMBOL NUMBER | LABEL | MODULATED DATA SYMBOL | MAPPING CHANGE SYMBOL | | AVERAGE SYMBOL |
|---|---|---|---|---|---|
| 9 | 1000 | -R | -3R | R | 0 |
| 10 | 1001 | -3R | -R | R | 0 |
| 11 | 1010 | -R | -3R | 3R | 0 |
| 12 | 1011 | -3R | -R | 3R | 0 |
| 13 | 1100 | -R | -3R | R | 0 |
| 14 | 1101 | -3R | -R | R | 0 |
| 15 | 1110 | -R | -3R | 3R | 0 |
| 16 | 1111 | -3R | -R | 3R | 0 |

R= 0.3162

FIG.26

RADIO TRANSMITTING APPARATUS, RADIO RECEIVING APPARATUS, RADIO TRANSMITTING METHOD AND RADIO RECEIVING METHOD

TECHNICAL FIELD

The present invention relates to a radio transmission apparatus, radio reception apparatus, radio transmission method and radio reception method used in a radio communication network system where channel estimation is performed along with transmission of streams.

BACKGROUND ART

As one approach to achieve high-speed transmission in a radio communication network system, a multiple-input multiple-output (MIMO) scheme has attracted attention. In the MIMO scheme, a plurality of data signal sequences are transmitted in parallel from a transmitting side having a plurality of antennas to a receiving side having a plurality of antennas, using the same frequency (band).

Further, as another approach to achieve high-speed transmission, there is a multicarrier scheme. In the multicarrier scheme, a plurality of data signal sequences respectively superimposed on a plurality of subcarriers are transmitted in parallel.

In recent years, various studies have been conducted on communication schemes that combine the MIMO scheme and multicarrier scheme. One example is a MIMO-OFDM scheme that combines the orthogonal frequency division multiplexing (OFDM) scheme, which is one example of the multicarrier scheme, with the MIMO scheme (see, for example, Patent Document 1).

In one example of a conventional radio communication network system that adopts the MIMO-OFDM scheme, data signals and pilot signals are time division multiplexed and transmitted. On the receiving side, channel estimation is performed using the received pilot signals. Then, coefficients for demultiplexing a plurality of streams are calculated using a channel estimation value, and the plurality of streams are demultiplexed and demodulated based on that coefficients. Furthermore, the pilot signal is a known signal, and the data signal is not a known signal. That is, the signal sequence of pilot signals transmitted from the transmitting side is known in advance on the receiving side, and the signal sequence of data signals transmitted from the transmitting side is not known in advance on the receiving side.

Patent Document 1: Japanese Patent Application Laid-Open No. 2002-44051

DISCLOSURE OF INVENTION

Problems to be Solved by the Invention

However, in the above-described conventional radio communication network system, the problem arises that the reception error rate characteristics deteriorate due to a decrease in channel estimation accuracy on the receiving side when the transmitting side or receiving side moving speed is fast.

It is therefore an object of the present invention to provide a radio transmission apparatus, radio reception apparatus, radio transmission method and radio reception method capable of improving reception error rate characteristics.

Means for Solving the Problem

The radio transmission apparatus of the present invention adopts a configuration having: a modulation section that modulates a data signal to obtain a modulation symbol; a generation section that generates a corresponding symbol that corresponds to the modulation symbol and becomes a signal having a specific value when combined with the modulation symbol; and a multiplexing section that multiplexes the modulation symbol and the corresponding symbol to obtain a multiplexed signal.

According to this configuration, channel estimation can be performed using a combined signal comprised of the modulation symbol of a data signal and its corresponding symbol on the receiving side, so that it is possible to improve the frequency at which channel estimation is performed, improve the channel estimation accuracy when the moving speed on the transmitting side or receiving side becomes fast, and improve the reception error rate characteristics.

The radio reception apparatus of the present invention adopts a configuration having: an extraction section that extracts from a multiplexed signal a modulation symbol of a data signal and a corresponding symbol that corresponds to the modulation symbol and is generated to become a signal having a specific value when combined with the modulation symbol; a generation section that generates a combined signal comprised of the modulation symbol and the corresponding symbol; and an estimation section that performs channel estimation based on the combined signal.

According to this configuration, channel estimation can be performed using a combined signal comprised of a modulation symbol of a data signal and its corresponding symbol, so that it is possible to improve the frequency at which channel estimation is performed, improve the channel estimation accuracy when the moving speed on the transmitting side or receiving side becomes fast, and improve the reception error rate characteristics.

The radio transmission method of the present invention includes: a modulation step of modulating a data signal to obtain a modulation symbol; a generation step of generating a corresponding symbol that corresponds to the modulation symbol and becomes a signal having a specific value when combined with the modulation symbol; and a multiplexing step of multiplexing the modulation symbol and the corresponding symbol to obtain a multiplexed signal.

According to this method, channel estimation using a combined signal comprised of a modulation symbol of a data signal and its corresponding symbol can be performed on the receiving side, so that it is possible to improve the frequency at which channel estimation is performed, improve the channel estimation accuracy when the moving speed on the transmitting side or receiving side becomes fast, and improve the reception error rate characteristics.

The radio reception method of the present invention includes: an extraction step of extracting from a multiplexed signal a modulation symbol of a data signal and a corresponding symbol that corresponds to the modulation symbol and is generated to become a signal having a specific value when combined with the modulation symbol; a generation step of generating a combined signal comprised of the modulation symbol and the corresponding symbol; and an estimation step of performing channel estimation based on the combined signal.

According to this method, channel estimation can be performed using a combined signal comprised of a modulation symbol of a data signal and its corresponding symbol, so that it is possible to improve the frequency at which channel estimation is performed, improve the channel estimation accuracy when the moving speed on the transmitting side or receiving side becomes fast, and improve the reception error rate characteristics.

Advantageous Effect of the Invention

According to the present invention, it is possible to improve the reception error rate characteristics.

BRIEF DESCRIPTION OF DRAWINGS

FIG. 5 shows the correspondence relationship between a QPSK symbol and Q inverted symbol according to Embodiment 1 of the present invention;

FIG. 6 shows the correspondence relationship between a QPSK symbol and an IQ inverted symbol according to Embodiment 1 of the present invention;

FIG. 9 illustrates an example of the operation of the estimation section according to Embodiment 1 of the present invention;

FIG. 12 shows the correspondence relationship between 16QAM symbols and mapping change symbols according to Embodiment 2 of the present invention;

FIG. 13 shows the I components and Q components of modulated data symbols, mapping change symbols and average symbols thereof according to Embodiment 2 of the present invention;

FIG. 16 shows the I components and Q components of modulated data symbols, mapping change symbols and average symbols thereof according to Embodiment 3 of the present invention;

FIG. 18 shows the I components and Q components of modulated data symbols, mapping change symbols and average symbols thereof according to Embodiment 4 of the present invention;

FIG. 20 shows the I components and Q components of modulated data symbols, mapping change symbols and average symbols thereof according to Embodiment 5 of the present invention;

FIG. 22 shows the correspondence relationship between 16QAM symbols and mapping change symbols according to Embodiment 6 of the present invention;

FIG. 23 shows the I components and Q components of modulated data symbols, mapping change symbols and average symbols thereof according to Embodiment 6 of the present invention;

FIG. 26 shows the I components and Q components of modulated data symbols, mapping change symbols and average symbols thereof according to Embodiment 6 of the present invention.

BEST MODE FOR CARRYING OUT THE INVENTION

Figure 1:
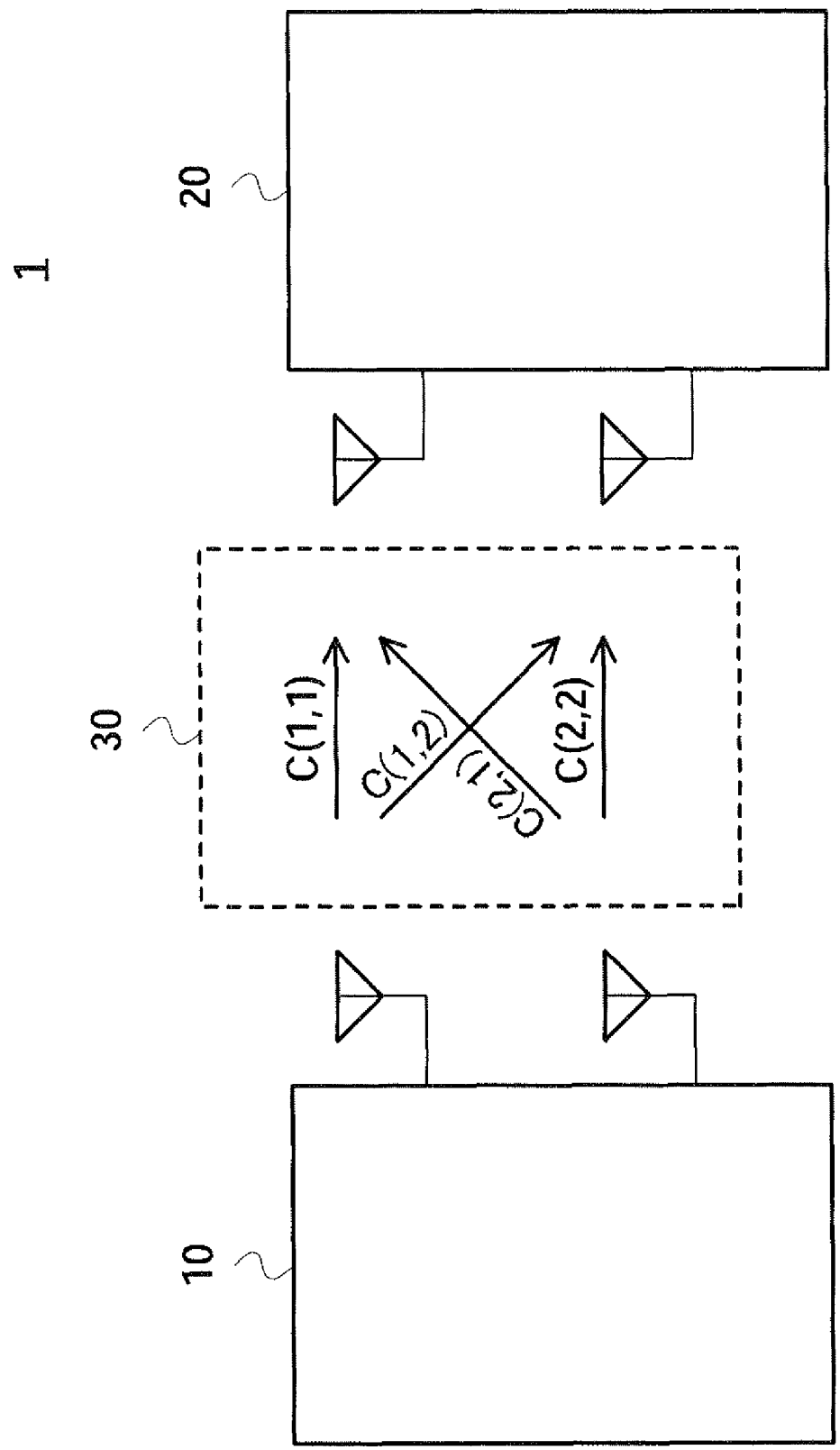
FIG. 1 is a configuration diagram of a radio communication system according to Embodiment 1 of the present invention.

Embodiments of the present invention will now be described in detail with reference to the accompanying drawings. In the embodiments, components having the same function will be assigned the same reference numerals, and descriptions thereof will be omitted.

Embodiment 1

FIG. 1 is a configuration diagram of the radio communication system according to Embodiment 1 of the present invention. In radio communication system 1 of FIG. 1, base station apparatus (hereinafter "base station") 10 and mobile station apparatus (hereinafter "mobile station") 20 perform radio communication via MIMO channel 30. The radio transmission apparatus according to Embodiment 1 of the present invention is applied to base station 10, and the radio reception apparatus according to Embodiment 1 of the present invention is applied to mobile station 20.

In radio communication system 1, a radio signal transmitted from base station 10 is received by mobile station 20 via MIMO channel 30. Further, in this embodiment, a case will be described where M (where M is an even number of 2 or higher) subcarriers are used for transmission and reception of data signals. Furthermore, M subcarriers are orthogonal each other. Identification numbers 1 to M are respectively assigned to the M subcarriers.

Both base station 10 and mobile station 20 have a plurality of antennas. In this embodiment, it is assumed that both have two antennas. Thus, MIMO channel 30 is defined by combinations of four channels. The four channel estimation values h(1, 1), h(1, 2), h(2, 1), and h(2, 2) can be obtained by estimating the characteristics C(1, 1), C(1, 2), C(2, 1) and C(2, 2) of the four channels. Furthermore, characteristic C (p, r) indicates the actual characteristic of the channel specified by the combination of the pth antenna provided in base station 10 and the rth antenna provided in mobile station 20, and channel estimation value h(p, r) indicates the estimation result of characteristic C(1, 2) (in this case, p=1, 2 and r=1, 2).

Furthermore, the number of antennas of base station 10 and mobile station 20 is not limited to two, but may be three or more. That is, when base station 10 has P (where P is an integer of 2 or higher) antennas and mobile station 20 has R (where R is an integer of 2 or higher) antennas, the P×R channel estimation values h(p, r) are calculated (in this case, p=1, 2, . . . , P and r=1, 2, . . . , R).

Figure 2:
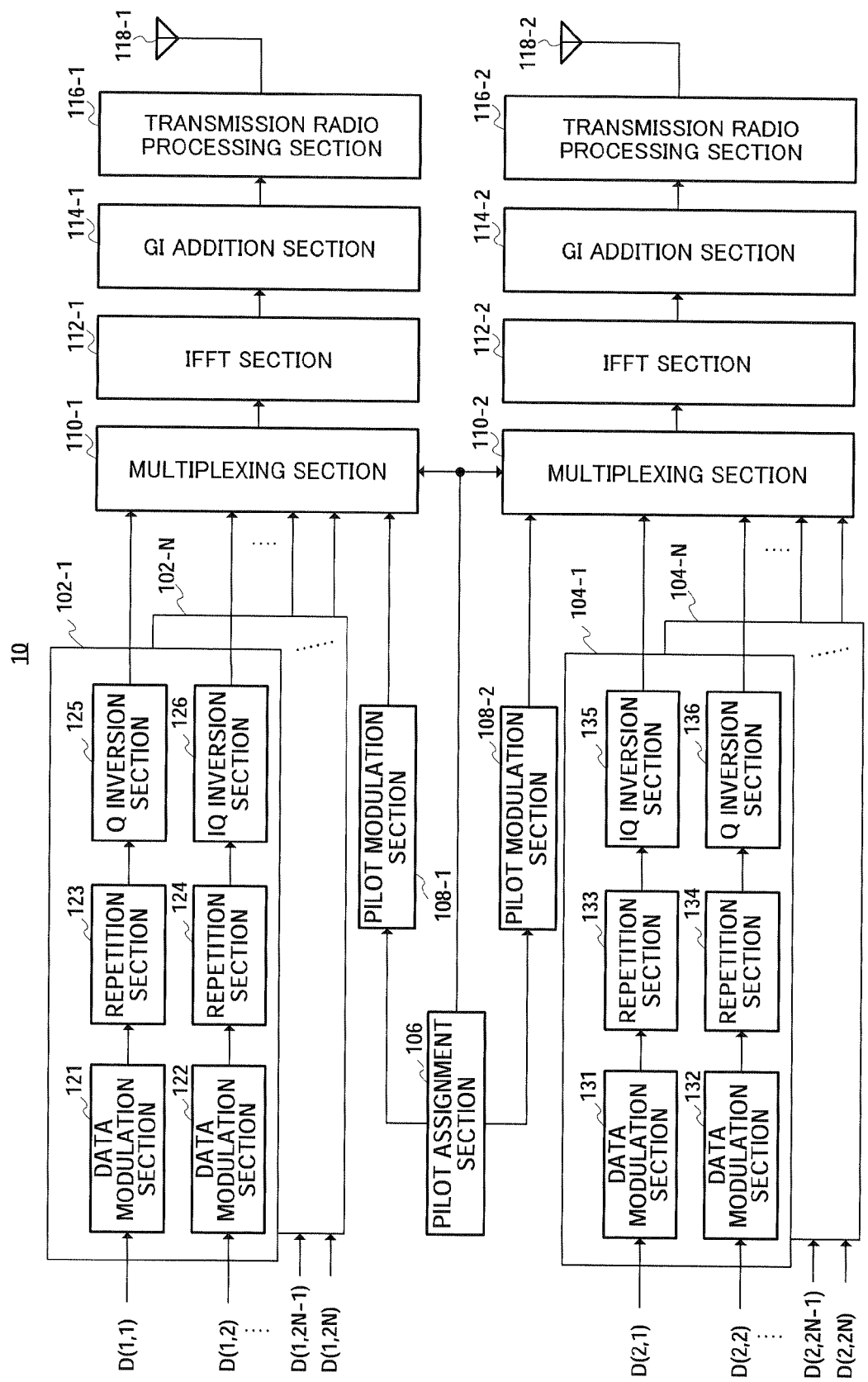
FIG. 2 is a block diagram showing a configuration of a base station apparatus according to Embodiment 1 of the present invention.

FIG. 2 is a block diagram showing a configuration of base station 10. Base station 10 has N (N=M/2) data symbol generation sections 102-1 to 102-N, N data symbol generation sections 104-1 to 104-N, pilot assignment section 106, two pilot modulation sections 108-1 and 108-2, two multiplexing sections 110-1 and 110-2, two inverse fast Fourier transform (IFFT) sections 112-1 and 112-2, two guard interval (GI) addition sections 114-1 and 114-2, two transmission radio processing sections 116-1 and 116-2 and two antennas 118-1 and 118-2.

Data symbol generation sections 102-1 to 102-N, pilot modulation section 108-1, multiplexing section 110-1, IFFT section 112-1, GI addition section 114-1, and transmission radio processing section 116-1 are provided in association with antenna 118-1, and data symbol generation sections 104-1 to 104-N, pilot modulation section 108-2, multiplexing section 110-2, IFFT section 112-2, GI addition section 114-2 and transmission radio processing section 116-2 are provided in association with antenna 118-2.

N data symbol generation sections 102-1 to 102-N have the same configuration, and therefore, are referred to as "data symbol generation section 102" in descriptions for arbitrary one of N data symbol generation sections 102-1 to 102-N. Additionally, N data symbol generation sections 104-1 to 104-N have the same configuration, and therefore, are referred to as "data symbol generation section 104" in descriptions for arbitrary one of N data symbol generation sections 104-1 to 104-N.

Data symbol generation section 102 and data symbol generation section 104 are each provided in association with two adjacent subcarriers out of M subcarriers. For example, data signals transmitted using subcarriers $f_1$ and $f_2$ are inputted to data symbol generation section 102-1.

More specifically, data signals inputted to data symbol generation section 102-1 include data signal D(1, 1) transmitted from antenna 118-1 using subcarrier $f_1$ and data signal D(1, 2) transmitted from antenna 118-1 using subcarrier $f_2$. Additionally, data signals inputted to data symbol generation section 104-1 include data signal D(2, 1) transmitted from antenna 118-1 using subcarrier $f_1$ and data signal D(2, 2) transmitted from antenna 118-2 using subcarrier $f_2$.

Furthermore, the data signal transmitted from antenna 118-$j$ (j=1, 2) using subcarrier $f_k$ (k=1, 2, . . . , 2N−1, 2N) can be expressed as D(j, k).

Data symbol generation section 102 has two data modulation sections 121 and 122, two repetition sections 123 and 124, Q inversion section 125 and IQ inversion section 126. Data modulation section 121, repetition section 123 and Q inversion section 125 are provided in association with D (1, 2n−1) transmitted from subcarriers having odd identification numbers, out of D(1, 2n−1) and D(1, 2n) inputted to data symbol generation section 102.

Data modulation section 122, repetition section 124 and IQ inversion section 126 are provided in association with D(1, 2n) transmitted from subcarriers having even identification numbers, out of D(1, 2n−1) and D(1, 2n) inputted to data symbol generation section 102. Furthermore, n is an arbitrary integer between 1 to N.

Data modulation section 121 modulates D(1, 2n−1) using quadrature phase shift keying (QPSK) and generates a modulated data symbol. The modulated data symbol generated by data modulation section 121 is outputted to repetition section 123. Data modulation section 122 modulates D (1, 2n) and generates a modulated data symbol. The modulated data symbol generated by data modulation section 122 is outputted to repetition section 124.

Repetition section 123 duplicates (repeats) the modulated data symbol inputted from data modulation section 121 according to the number of repetitions. In this embodiment, the number of repetitions is "2." That is, repetition section 123 outputs the inputted modulated data symbol as is to Q inversion section 125, and following the output of the modulated data symbol, generates a duplicate data symbol having the same value as the modulated data symbol and outputs the duplicate data symbol to Q inversion section 125.

Repetition section 124 repeats the modulated data symbol inputted from data modulation section 122 according to the number of repetitions. In this embodiment, the number of repetitions is "2." That is, repetition section 124 outputs the inputted modulated data symbol as is to IQ inversion section 126 and then, following the output of the modulated data symbol, generates a duplicate data symbol having the same value as the modulated data symbol and outputs the duplicate data symbol to IQ inversion section 126.

Q inversion section 125 as a generation means of a radio transmission apparatus, outputs the modulated data symbol inputted from repetition section 123 as is to multiplexing section 110-1. Q inversion section 125 inverts the positive/negative sign of the value of the quadrature (Q) component of the duplicate data symbol inputted after the modulated data symbol from repetition section 123 and generates a Q inverted data symbol. The generated Q inverted data symbol is outputted to multiplexing section 110-1 following the output of the modulated data symbol. This Q inverted data symbol corresponds to the modulated data symbol generated by data modulation section 121 and becomes a signal having a specific value when combined with the modulated data symbol. Further, the average symbol obtained when the Q inverted symbol and modulated data symbol are combined is substantially the same as the binary phase shift keying (BPSK) modulated signal.

IQ inversion section 126 as a generation means of a radio transmission apparatus, outputs the modulated data symbol inputted from repetition section 124 as is to multiplexing section 110-1. IQ inversion section 126 inverts the positive/negative sign of the value of the in-phase (I) component and the positive/negative sign of the value of the Q component of the duplicate data symbol inputted after the modulated data symbol from repetition section 124 and generates an IQ inverted data symbol. That is, this IQ inverted data symbol corresponds to the modulated data symbol generated by data modulation section 122 and becomes a signal having a specific value when combined with the modulated data symbol. The generated IQ inverted data symbol is outputted to multiplexing section 110-1 following the output of the modulated data symbol. In the following descriptions, the Q inverted symbol and the IQ inverted symbol are generically referred to as "inverted symbol."

Data symbol generation section 104 has two data modulation sections 131 and 132, two repetition sections 133 and 134, IQ inversion section 135 and Q inversion section 136. Data modulation section 131, repetition section 133 and IQ inversion section 135 are provided in association with D(2, 2n−1) transmitted from subcarriers having odd identification numbers, out of D(2, 2n−1) and D(2, 2n) inputted to data symbol generation section 104.

On the other hand, data modulation section 132, repetition section 134 and Q inversion section 136 are provided in association with D(2, 2n) transmitted from subcarriers having even identification numbers, out of D(2, 2n−1) and D(2, 2n) inputted to data symbol generation section 104.

Data modulation section 131 modulates D(2, 2n−1) to generate a modulated data symbol. The modulated data symbol generated by data modulation section 131 is outputted to repetition section 133. Data modulation section 132 modulates D(2, 2n) using QPSK to generate a modulated data symbol. The modulated data symbol generated by data modulation section 132 is outputted to repetition section 134.

Repetition section 133 repeats the modulated data symbol inputted from data modulation section 131 according to the number of repetitions. In this embodiment, the number of repetitions is "2." That is, repetition section 133 outputs the inputted modulated data symbol as is to IQ inversion section 135 and then, following the output of the modulated data symbol, generates a duplicate data symbol having the same value as the modulated data symbol and outputs the duplicate data symbol to IQ inversion section 135.

Repetition section 134 repeats the modulated data symbol inputted from data modulation section 132 according to the number of repetitions. In this embodiment, the number of repetitions is "2." That is, repetition section 134 outputs the inputted modulated data symbol as is to Q inversion section 136 and then, following the output of the modulated data symbol, generates a duplicate data symbol having the same value as the modulated data symbol and outputs the duplicate data symbol to Q inversion section 136.

IQ inversion section 135 as a generation means of a radio transmission apparatus, outputs the modulated data symbol inputted from repetition section 133 as is to multiplexing section 110-2. IQ inversion section 135 inverts the positive/negative sign of the value of the I component and the positive/negative sign of the value of the Q component of the duplicate data symbol inputted after the modulated data symbol from repetition section 133 and generates an IQ inverted data symbol. This IQ inverted data symbol corresponds to the modulated data symbol generated by data modulation section 131 and becomes a signal having a specific value when combined with the modulated data symbol. The generated IQ inverted data symbol is outputted to multiplexing section 110-2 following the output of the modulated data symbol.

Q inversion section 136 as a generation means of a radio transmission apparatus, outputs the modulated data symbol inputted from repetition section 134 as is to multiplexing section 110-2. Q inversion section 136 inverts the positive/negative sign of the value of the Q component of the duplicate data symbol inputted after the modulated data symbol from repetition section 134 and generates a Q inverted data symbol. This Q inverted data symbol corresponds to the modulated data symbol generated by data modulation section 132 and becomes a signal having a specific value when combined with the modulated data symbol. The generated Q modulated data symbol is outputted to multiplexing section 110-2 following the output of the modulated data symbol.

Pilot assignment section 106 assigns pilot signals to the odd number subcarriers and the even number subcarriers. The pilot signals assigned to the odd number subcarriers are outputted to pilot modulation section 108-1, and the pilot signals assigned to the even number subcarriers are outputted to pilot modulation section 108-2. Further, pilot assignment section 106 generates a zero signal having a zero value. The generated zero signal is outputted to multiplexing sections 110-1 and 110-2. Furthermore, the pilot signal and zero signal are known signals.

Pilot modulation section 108-1 modulates the pilot signals inputted from pilot assignment section 106 and generates a pilot symbol. The generated pilot symbol is outputted to multiplexing section 110-1. In this embodiment, BPSK is used for modulation of the pilot signals.

Pilot modulation section 108-2 modulates the pilot signals inputted from pilot assignment section 106 and generates a pilot symbol. In this embodiment, BPSK is used for this modulation. The generated pilot symbol is outputted to multiplexing section 110-2.

That is, the combination of the pilot assignment section 106 and pilot modulation sections 108-1 and 108-2 configures a known signal generation section that generates a known signal.

Multiplexing section 110-1 multiplexes the modulated data symbol and Q inverted data symbol inputted from Q inversion section 125, the modulated data symbol and IQ inverted data symbol inputted from IQ inversion section 126, the pilot symbol inputted from pilot modulation section 108-1, and the zero signal inputted from pilot assignment section 106 and generates a multiplexed signal to be transmitted from antenna 118-1. The format of the multiplexed signal generated by multiplexing section 110-1 will be specifically described later.

Multiplexing section 110-2 multiplexes the modulated data symbol and IQ inverted data symbol inputted from IQ inversion section 135, the modulated data symbol and Q inverted data symbol inputted from Q inversion section 136, the pilot symbol inputted from pilot modulation section 108-2, and the zero signal inputted from pilot assignment section 106 and generates a multiplexed signal to be transmitted from antenna 118-2. The format of the multiplexed signal generated by multiplexing section 110-2 will be specifically described later.

IFFT section 112-1 as an assignment means, performs IFFT processing on the multiplexed signal generated by multiplexing section 110-1, and thereby assigns the multiplexed signal to subcarriers. IFFT section 112-2 as an assignment means, performs IFFT processing on the multiplexed signal generated by multiplexing section 110-2, and thereby assigns the multiplexed signal to subcarriers.

GI addition section 114-1 adds a GI at a predetermined position of the multiplexed signal subjected to IFFT processing by IFFT section 112-1. GI addition section 114-2 adds a GI at a predetermined position of the multiplexed signal subjected to IFFT processing by IFFT section 112-2.

Transmission radio processing section 116-1 generates a radio signal by performing predetermined transmission radio processing (such as D/A conversion and up-conversion) on the multiplexed signal to which GI is added by GI addition section 114-1, and transmits the generated radio signal from antenna 118-1. Transmission radio processing section 116-2 generates a radio signal by performing predetermined transmission radio processing on the multiplexed signal to which GI is added by GI addition section 114-2, and transmits the generated radio signal from antenna 118-2.

Next, the format of the multiplexed signal generated at base station 10 having the above-described configuration will be explained. Here, the format will be explained for multiplexed signals transmitted using subcarriers $f_1$ and $f_2$ during a period between time t1 and time t5.

Figure 3:
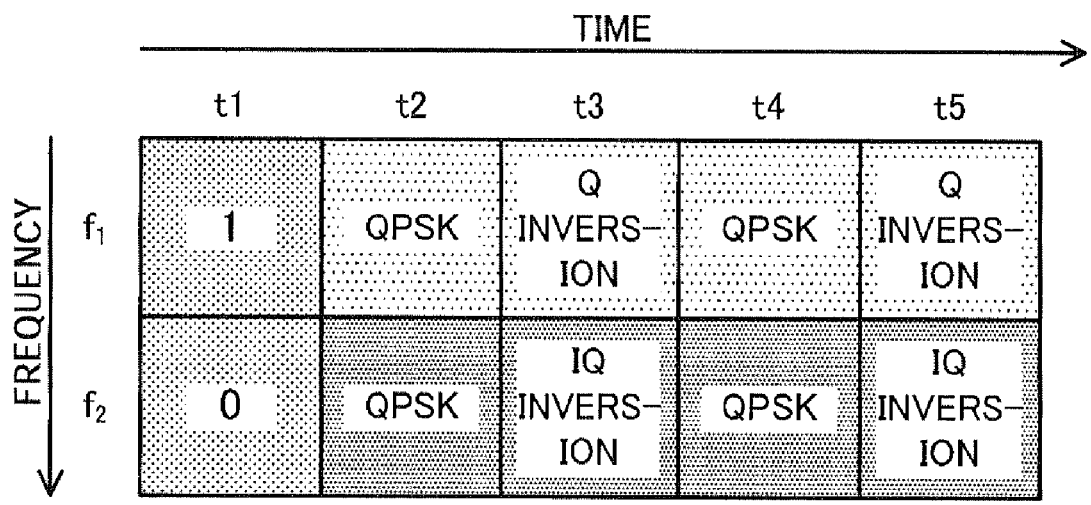
FIG. 3 shows an example of a format of a multiplexed signal transmitted from one of a plurality of antennas of the base station apparatus according to Embodiment 1 of the present invention.

First, an example of the format of the multiplexed signal transmitted from antenna 118-1 will be explained with reference to FIG. 3. At a position of subcarrier $f_1$ and time t1, a BPSK modulated signal having a value of "1"—a pilot symbol generated by pilot modulation section 108-1—is arranged. At a position of subcarrier $f_1$ and time t2, a modulated data symbol (QPSK symbol) generated by data modulation section 121 is arranged. At a position of subcarrier $f_1$ and time t3, a Q inverted data symbol generated by Q inversion section 125—a Q inverted symbol corresponding to the QPSK symbol arranged at the position of subcarrier $f_1$ and time t2—is arranged. At a position of subcarrier $f_1$ and time t4, a QPSK symbol generated by data modulation section 121 (that is, a modulated data symbol generated following the QPSK symbol arranged at the position of subcarrier $f_1$ and time t2) is arranged. At a position of subcarrier $f_1$ and time t5, a Q inverted data symbol generated by Q inversion section 125—a Q inverted symbol corresponding to the QPSK symbol arranged at the position of subcarrier $f_1$ and time t4—is arranged.

That is, in the multiplexed signal transmitted from antenna 118-1, the subcarrier signal corresponding to subcarrier $f_1$ is a signal obtained by time division multiplexing a signal having a known value (that is, the pilot symbol generated by pilot modulation section 108-1) the QPSK symbol generated by data modulation section 121 and the Q inverted symbol generated by Q inversion section 125.

Further, at a position of subcarrier $f_2$ and time t1, the zero signal is arranged (that is, a pilot symbol is not arranged at this position). At a position of subcarrier $f_2$ and time t2, a QPSK symbol generated by data modulation section 122 is arranged. At a position of subcarrier $f_2$ and time t3, an IQ inverted data symbol generated by IQ inversion section 126—an IQ inverted symbol corresponding to the QPSK symbol arranged at the position of subcarrier $f_2$ and time t2—is arranged. At a position of subcarrier $f_2$ and time t4, a QPSK symbol generated by data modulation section 122 (that is, a modulated data symbol generated following the QPSK symbol arranged at the position of subcarrier $f_2$ and time t2) is arranged. At a position of subcarrier $f_2$ and time t5, an IQ inverted data symbol generated by IQ inversion section 126—an IQ inverted symbol corresponding to the QPSK symbol arranged at the position of subcarrier $f_2$ and time t4—is arranged.

That is, in the multiplexed signal transmitted from antenna 118-1, the subcarrier signal corresponding to subcarrier $f_2$ is a signal obtained by time division multiplexing a signal having a known value (that is, the zero signal), the QPSK symbol generated by data modulation section 122 and the IQ inverted symbol generated by IQ inversion section 126.

Figure 4:
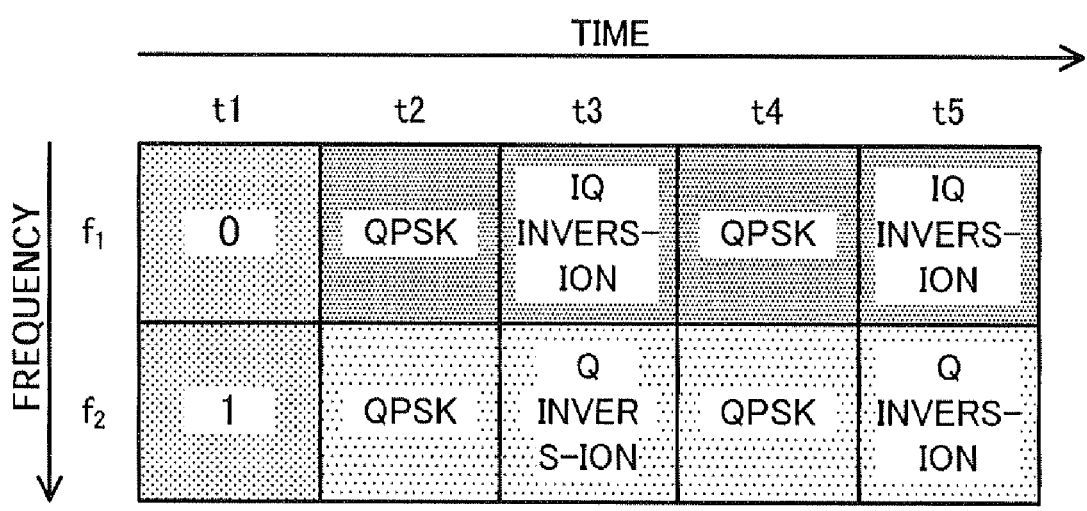
FIG. 4 shows another example of a format of the multiplexed signal transmitted from one of the plurality of antennas of the base station apparatus according to Embodiment 1 of the present invention.

Next, an example of the format of the multiplexed signal transmitted from antenna 118-2 will be explained with reference to FIG. 4. At a position of subcarrier $f_1$ and time t1, the zero signal is arranged (that is, a pilot symbol is not arranged at this position). At a position of subcarrier $f_1$ and time t2, a QPSK symbol generated by data modulation section 131 is arranged. At a position of subcarrier $f_1$ and time t3, an IQ inverted data symbol generated by IQ inversion section 135—an IQ inverted symbol corresponding to the QPSK symbol arranged at the position of subcarrier $f_1$ and time t2—is arranged. At a position of subcarrier $f_1$ and time t4, a QPSK symbol generated by data modulation section 131 (that is, a modulated data symbol generated following the QPSK symbol arranged at the position of subcarrier $f_1$ and time t2) is arranged. At a position of subcarrier $f_1$ and time t5, an IQ inverted data symbol generated by IQ inversion section 135—an IQ inverted symbol corresponding to the QPSK symbol arranged at the position of subcarrier $f_1$ and time t4—is arranged.

That is, in the multiplexed signal transmitted from antenna 118-2, the subcarrier signal corresponding to subcarrier $f_1$ is a signal obtained by time division multiplexing a signal having a known value (that is, the zero signal), the QPSK symbol generated by data modulation section 131 and the IQ inverted symbol generated by IQ inversion section 135.

At a position of subcarrier $f_2$ and time t1, a BPSK modulated signal having a value of "1"—a pilot symbol generated by pilot modulation section 108-2—is arranged. At a position of subcarrier $f_2$ and time t2, a QPSK symbol generated by data modulation section 132 is arranged. At a position of subcarrier $f_2$ and time t3, a Q inverted data symbol generated by Q inversion section 136—a Q inverted symbol corresponding to the QPSK symbol arranged at the position of subcarrier $f_2$ and time t2—is arranged. At a position of subcarrier $f_2$ and time t4, a QPSK symbol generated by data modulation section 132 (that is, a modulated data symbol generated following the QPSK symbol arranged at the position of subcarrier $f_2$ and time t2) is arranged. At a position of subcarrier $f_2$ and time t5, a Q inverted data symbol generated by Q inversion section 136—a Q inverted symbol corresponding to the QPSK symbol arranged at the position of subcarrier $f_2$ and time t4—is arranged.

That is, in the multiplexed signal transmitted from antenna 118-2, the subcarrier signal corresponding to subcarrier $f_2$ is a signal obtained by time division multiplexing a signal having a known value (that is, the pilot symbol generated by pilot modulation section 108-2), the QPSK symbol generated by data modulation section 132 and the Q inverted symbol generated by Q inversion section 136.

Here, the correspondence relationship between the QPSK symbol and Q inverted symbol will be explained with reference to FIG. 5. FIG. 5A shows an example of a QPSK symbol. FIG. 5B shows a Q inverted symbol obtained by inverting the positive/negative sign of the Q component of the QPSK symbol. When the QPSK symbol of FIG. 5A and the Q inverted symbol of FIG. 5B are combined through averaging processing, an average symbol as shown in FIG. 5C is obtained. This average symbol is substantially the same as the BPSK modulated signal. That is, the Q inverted symbol generated by Q inversion sections 125 and 136 is a signal of information of "−1" or "1" when combined with the corresponding QPSK symbol through averaging processing.

The correspondence relationship between the QPSK symbol and IQ inverted symbol will now be explained with reference to FIG. 6. FIG. 6A shows an example of a QPSK symbol. FIG. 6B shows an IQ inverted symbol obtained by inverting the positive/negative sign of the I component and the positive/negative sign of the Q component of the QPSK symbol. When the QPSK symbol of FIG. 6A and the IQ inverted symbol of FIG. 6B are combined through averaging processing, an average symbol as shown in FIG. 6C is obtained. This average symbol is substantially the same as the zero signal. That is, the IQ inverted symbol generated by IQ inversion sections 126 and 135 is a signal having the specific value "0" when combined with the corresponding QPSK symbol through averaging processing.

Figure 7:
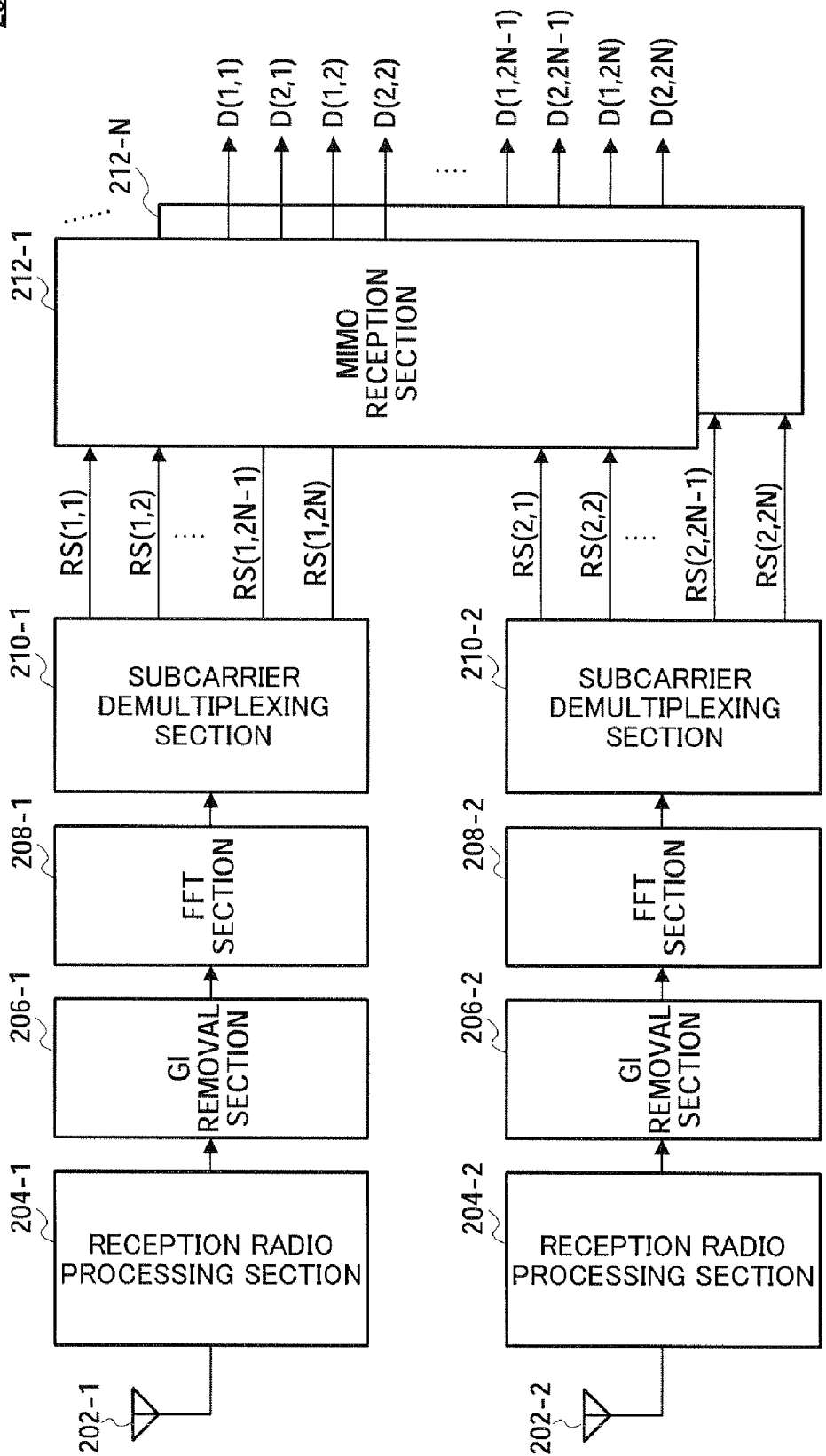
FIG. 7 is a block diagram showing a configuration of a mobile station apparatus according to Embodiment 1 of the present invention.

The configuration of mobile station 20 will now be described. As shown in FIG. 7, mobile station 20 has two antennas 202-1 and 202-2, two reception radio processing sections 204-1 and 204-2, two GI removal sections 206-1 and 206-2, two fast Fourier transform (FFT) sections 208-1 and 208-2, two subcarrier demultiplexing sections 210-1 and 210-2 and N MIMO reception sections 212-1 to 212-N. Furthermore, N MIMO reception sections 212-1 to 212-N have the same configuration, and therefore, are hereinafter referred to as "MIMO reception section 212" in descriptions for arbitrary one of N MIMO reception sections 212-1 to 212-N.

Reception radio processing section 204-1, GI removal section 206-1, FFT section 208-1, and subcarrier demultiplexing section 210-1 are provided in association with antenna 202-1, and reception radio processing section 204-2, GI removal section 206-2, FFT section 208-2 and subcarrier demultiplexing section 210-2 are provided in association with antenna 202-2.

Reception radio processing section 204-1 receives via antenna 202-1 a radio signal transmitted from base station 10 and obtains the received signal by performing predetermined reception radio processing (such as down-conversion and A/D conversion) on the radio signal. Reception radio processing section 204-2 receives via antenna 202-2 a radio signal transmitted from base station 10 and obtains the received signal by performing predetermined reception radio processing (such as down-conversion and A/D conversion) on the radio signal.

GI removal section 206-1 removes the GI added in a predetermined position of the received signal obtained by reception radio processing section 204-1. GI removal section 206-2 removes the GI added in a predetermined position of the received signal obtained by reception radio processing section 204-2.

FFT section 208-1 performs FFT processing on the received signal from which the GI is removed by GI removal section 206-1. FFT section 208-2 performs FFT processing on the received signal from which the GI is removed by GI removal section 206-2.

Subcarrier demultiplexing section 210-1 demultiplexes on a per channel estimation unit basis the received signal subjected to FFT processing by FFT section 208-1. In this embodiment, as an example, the combination of two subcarriers $f_{2n-1}$ and $f_{2n}$ is used as a channel estimation unit. Thus, subcarrier demultiplexing section 210-1 outputs to MIMO reception section 212 received signal RS(2, $2n-1$) of subcarrier $f_{2n-1}$ and received signal RS(1, $2n$) of subcarrier $f_{2n}$. More specifically, RS (1, 1) and RS (1, 2) are outputted to MIMO reception section 212-1, and RS(1, 2N−1) and RS(1, 2N) are outputted to MIMO reception section 212-N.

Furthermore, the received signal of subcarrier $f_k$ received by antenna 202-$i$ (i=1, 2) is expressed as RS(i, k).

Subcarrier demultiplexing section 210-2 demultiplexes on a per channel estimation unit basis the received signal subjected to FFT processing by FFT section 208-2. In this embodiment, as an example, the combination of two subcarriers $f_{2n-1}$ and $f_{2n}$ is used as a channel estimation unit. Thus, subcarrier demultiplexing section 210-2 outputs to MIMO reception section 212 received signal RS(2, $2n-1$) of subcarrier $f_{2n-1}$ and received signal RS(2, $2n$) of subcarrier $f_{2n}$. More specifically, RS(2, 1) and RS(2, 2) are outputted to MIMO reception section 212-1, and RS(2, 2N−1) and RS(2, 2N) are outputted to MIMO reception section 212-N.

MIMO reception section 212 performs MIMO reception processing on RS(1, $2n-1$) and RS(1, $2n$) inputted from subcarrier demultiplexing section 210-1, and RS(2, $2n-1$) and RS(2, $2n$) inputted from subcarrier demultiplexing section 210-2, and outputs D(j, $2n-1$) and D(j, $2n$) transmitted from base station 10.

Figure 8:
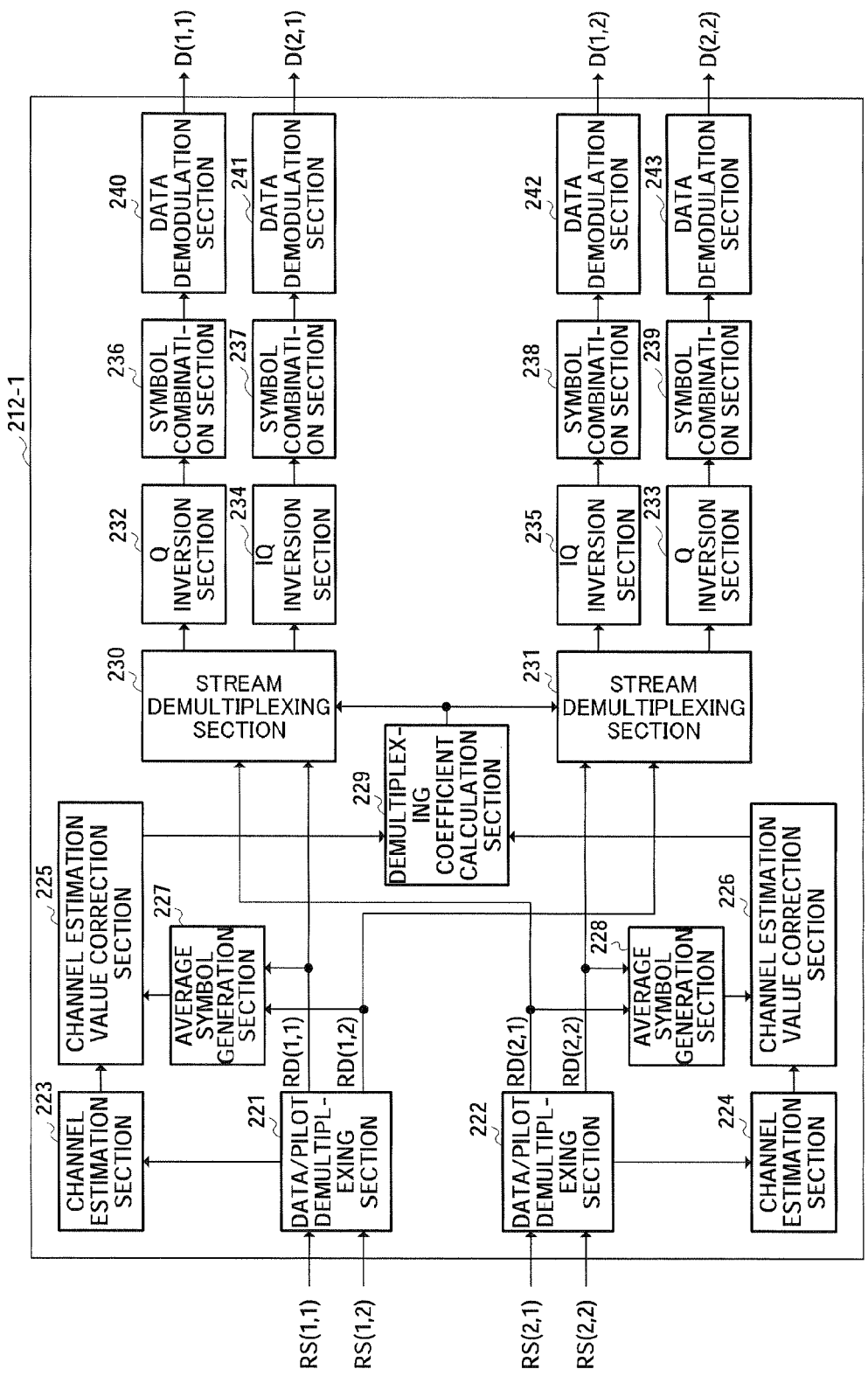
FIG. 8 is a block diagram showing a configuration of a MIMO reception section according to Embodiment 1 of the present invention.

Here, the internal configuration of MIMO reception section 212 will be described with reference to the block diagram of MIMO reception section 212-1 shown in FIG. 8.

MIMO reception section 212 has two data/pilot demultiplexing sections 221 and 222, two channel estimation sections 223 and 224, two channel estimation value correction sections 225 and 226, two average symbol generation sections 227 and 228, demultiplexing coefficient calculation section 229, two stream demultiplexing sections 230 and 231, two Q inversion sections 232 and 233, two IQ inversion sections 234 and 235, four symbol combination sections 236, 237, 238 and 239, and four data demodulation sections 240, 241, 242 and 243.

Data/Pilot demultiplexing section 221 as an extraction means, demultiplexes the data symbols and pilot symbols of RS(1, $2n-1$) and RS(1, $2n$) inputted from subcarrier demultiplexing section 210-1.

Specifically, data/pilot demultiplexing section 221 extracts the signal RD(1, $2n-1$) of the portion corresponding to the data symbol and the signal of the portion corresponding to the pilot symbol from RS(1, $2n-1$) outputs the signal of the portion corresponding to the pilot symbol to channel estimation section 223, and outputs RD(1, $2n-1$) to stream demultiplexing section 230 and average symbol generation section 227.

Further, data/pilot demultiplexing section 221 extracts signal RD(1, $2n$) of the portion corresponding to the data symbol and the signal of the portion corresponding to the pilot symbol from RS (1, $2n$), outputs the signal of the portion corresponding to the pilot symbol to channel estimation section 223, and outputs RD(1, $2n$) to stream demultiplexing section 231 and average symbol generation section 227.

RD(1, $2n-1$) and RD(1, $2n$) are comprised of a portion corresponding to a modulated data symbol and a portion corresponding to an inverted symbol generated to become a signal having a specific value when combined with the modulation symbol through averaging processing.

Channel estimation section 223 performs channel estimation using an input signal from data/pilot demultiplexing section 221, and obtains channel estimation values h(1, 1) and h(2, 1). The obtained channel estimation values h(1, 1) and h(2, 1) are outputted to channel estimation value correction section 225.

RD(1, $2n-1$) and RD(1, $2n$) are inputted from data/pilot demultiplexing section 221 to average symbol generation section 227 used as a generation means of the radio reception apparatus. Average symbol generation section 227 combines through averaging processing the portion corresponding to the modulated data symbol in RD(1, $2n-1$) and the portion arranged at the position immediately after the portion, that is, the portion corresponding to the inverted symbol. As a result, an average symbol is generated.

Further, average symbol generation section 227 combines through averaging processing the portion corresponding to the modulated data symbol in RD(1, $2n$) and the portion arranged at the position immediately after the portion, that is, the portion corresponding to the inverted symbol. As a result, an average symbol is generated. The generated average symbols are outputted to channel estimation value correction section 225.

Channel estimation value correction section 225 corrects channel estimation values h(1, 1) and h(2, 1) inputted from channel estimation section 223 using the average symbols inputted from average symbol generation section 227. The corrected channel estimation values h (1, 1) and h(2, 1) are outputted to demultiplexing coefficient calculation section 229. That is, the combination of channel estimation section 223 and channel estimation value correction section 226 configure an estimation section used as an estimation means of the radio reception apparatus. A specific example of the operation of the estimation section will be described later.

Data/Pilot demultiplexing section 222 as an extraction means, demultiplexes the data symbols and pilot symbols of RS(2, 2n–1) and RS(2, 2n) inputted from subcarrier demultiplexing section 210-2.

Specifically, data/pilot demultiplexing section 222 extracts signal RD(2, 2n–1) of the portion corresponding to the data symbol and the signal of the portion corresponding to the pilot symbol from RS (2, 2n–1) outputs the signal of the portion corresponding to the pilot symbol to channel estimation section 224, and outputs RD(2, 2n–1) to stream demultiplexing section 230 and average symbol generation section 228.

Further, data/pilot demultiplexing section 222 extracts signal RD(2, 2n) of the portion corresponding to the data symbol and the signal of the portion corresponding to the pilot symbol from RS (2, 2n), outputs the signal of the portion corresponding to the pilot symbol to channel estimation section 224, and outputs RD(2, 2n) to stream demultiplexing section 231 and average symbol generation section 228. RD(2, 2n–1) and RD(2, 2n) is comprised of a portion corresponding to a modulated data symbol and a portion corresponding to an inverted symbol generated to become a signal having a specific value when combined with the modulation symbol through averaging processing.

Channel estimation section 224 performs channel estimation using an input signal from data/pilot demultiplexing section 222, and obtains channel estimation values h(1, 2) and h(2, 2). The obtained channel estimation values h (1, 2) and h (2, 2) are outputted to channel estimation value correction section 226.

RD(2, 2n–1) and RD(2, 2n) are inputted from data/pilot demultiplexing section 222 to average symbol generation section 228 used as a generation means of the radio reception apparatus. Average symbol generation section 228 combines through averaging processing the portion corresponding to the modulated data symbol in RD(2, 2n–1) and the portion arranged at the position immediately after the portion, that is, the portion corresponding to the inverted symbol. As a result, an average symbol is generated.

Further, average symbol generation section 228 combines through averaging processing the portion corresponding to the modulated data symbol in RD(2, 2n) and the portion arranged at the position immediately after the portion, that is, the portion corresponding to the inverted symbol. As a result, an average symbol is generated. The generated average symbols are outputted to channel estimation value correction section 226.

Channel estimation value correction section 226 corrects channel estimation values h(1, 2) and h(2, 2) inputted from channel estimation section 224 using the average symbols inputted from average symbol generation section 228. The corrected channel estimation values h (1, 2) and h(2, 2) are outputted to demultiplexing coefficient calculation section 229. That is, the combination of channel estimation section 224 and channel estimation value correction section 226 configures an estimation section used as an estimation means of the radio reception apparatus, similar to the combination of channel estimation section 223 and channel estimation value correction section 225. A specific example of the operation of the estimation section will be described later.

Demultiplexing coefficient calculation section 229 calculates demultiplexing coefficients for demultiplexing a plurality of streams transmitted via MIMO channel 30 using channel estimation values h(1, 1), h(1, 2), h(2, 1) and h(2, 2) inputted from channel estimation value correction sections 225 and 226. The demultiplexing coefficients are calculated by, for example, obtaining the inverse matrix of channel matrix H obtained from channel estimation values h(1, 1), h(1, 2), h(2, 1) and h(2, 2). The calculated demultiplexing coefficients are outputted to stream demultiplexing sections 230 and 231.

Stream demultiplexing section 230 performs stream demultiplexing on RD(1, 2n–1) inputted from data/pilot demultiplexing section 221 and RD(2, 2n–1) inputted from data/pilot demultiplexing section 222. The demultiplexing coefficients inputted from demultiplexing coefficient calculation section 229 are used in this stream demultiplexing processing. Further, D(1, 2n–1) and D(2, 2n–1) are obtained through the stream demultiplexing processing of stream demultiplexing section 230. D(1, 2n–1) and D(2, 2n–1) are outputted to Q inversion section 232 and IQ inversion section 234, respectively.

Q inversion section 232 outputs the modulated data symbol in D(1, 2n–1) inputted from stream demultiplexing section 230 as is to symbol combination section 236. Further, Q inversion section 232 inverts the positive/negative sign of the value of the Q component of the Q inverted symbol in D (1, 2n–1) inputted from stream demultiplexing section 230 and restores the duplicate symbol. Then, Q inversion section 232 outputs the restored duplicate symbol to symbol combination section 236 following the output of the modulated data symbol.

Symbol combination section 236 combines the modulated data symbol inputted from Q inversion section 232 and the duplicate symbol inputted from Q inversion section 232 after the modulated data symbol to obtain a combined data symbol. The obtained combined symbol is inputted to data demodulation section 240.

Data demodulation section 240 demodulates the combined data symbol inputted from symbol combination section 236 and outputs D(1, 2n–1). In this embodiment, QPSK is used for demodulation of D(1, 2n–1), and therefore data demodulation section 240 uses QPSK for demodulation processing.

IQ inversion section 234 outputs the modulated data symbol of D(2, 2n–1) inputted from stream demultiplexing section 230 as is to symbol combination section 237. Further, IQ inversion section 234 inverts the positive/negative sign of the I component and the positive/negative sign of the Q component of the IQ inverted symbol in D(2, 2n–1) inputted from stream demultiplexing section 230 and restores the duplicate symbol. Then, IQ inversion section 234 outputs the restored duplicate symbol to symbol combination section 237 following the output of the modulated data symbol.

Symbol combination section 237 combines the modulated data symbol inputted from IQ inversion section 234 and the duplicate symbol inputted from IQ inversion section 234 after the modulated data symbol to obtain a combined data symbol. The obtained combined symbol is inputted to data demodulation section 241.

Data demodulation section 241 demodulates the combined data symbol inputted from symbol combination section 237 and outputs D(2, 2n–1).

Stream demultiplexing section 231 performs stream demultiplexing on RD(1, 2n) inputted from data/pilot demultiplexing section 221 and RD(2, 2n) inputted from data/pilot demultiplexing section 222. The demultiplexing coefficients inputted from demultiplexing coefficient calculation section 229 are used in this stream demultiplexing processing. Further, D(1, 2n) and D(2, 2n) are obtained through the stream demultiplexing processing of stream demultiplexing section

231. D(1, 2n) and D(2, 2n) are outputted to IQ inversion section 235 and Q inversion section 233, respectively.

IQ inversion section 235 outputs the modulated data symbol in D(1, 2n) inputted from stream demultiplexing section 231 as is to symbol combination section 238. Further, IQ inversion section 235 inverts both the positive/negative sign of the value of the I component and the positive/negative sign of the value of the Q component of the IQ inverted symbol in D(1, 2n) inputted from stream demultiplexing section 231 and restores the duplicate symbol. Then, IQ inversion section 235 outputs the restored duplicate symbol to symbol combination section 238 following the output of the modulated data symbol.

Symbol combination section 238 combines the modulated data symbol inputted from IQ inversion section 235 and the duplicate symbol inputted from IQ inversion section 235 after the modulated data symbol to obtain a combined data symbol. The obtained combined symbol is inputted to data demodulation section 242.

Data demodulation section 242 demodulates the combined data symbol inputted from symbol combination section 238 and outputs D(1, 2n).

Q inversion section 233 outputs the modulated data symbol in D(2, 2n) inputted from stream demultiplexing section 231 as is to symbol combination section 239. Further, Q inversion section 233 inverts the positive/negative sign of the Q component of the Q inverted symbol in D(2, 2n) inputted from stream demultiplexing section 231 and restores the duplicate symbol. Then, Q inversion section 233 outputs the restored duplicate symbol to symbol combination section 239 following the output of the modulated data symbol.

Symbol combination section 239 combines the modulated data symbol inputted from Q inversion section 233 and the duplicate symbol inputted from Q inversion section 233 after the modulated data symbol to obtain a combined data symbol. The obtained combined symbol is inputted to data demodulation section 243.

Data demodulation section 243 demodulates the combined data symbol inputted from symbol combination section 239 and outputs D(2, 2n). In this embodiment, QPSK is used for modulation of D(2, 2n), and therefore data demodulation section 243 uses QPSK for demodulation processing.

Next, an operation example of the estimation section of mobile station 20 will be described with reference to FIG. 9. Here, multiplexed signals transmitted using subcarriers $f_1$ and $f_2$ during a period between time t1 and time t5 will be described.

The multiplexed signal shown in FIG. 9A is transmitted from antenna 118-1 of base station 10. The format of the multiplexed signal of FIG. 9A is the same as that shown in FIG. 3. Furthermore, the numbers in parentheses shown at the arranged positions of the QPSK symbol and Q inverted symbol are the I component values and Q component values of the symbols.

The multiplexed signal shown in FIG. 9B is transmitted from antenna 118-2 of base station 10. The format of the multiplexed signal of FIG. 9B is the same as that shown in FIG. 4. Furthermore, the numbers in parentheses shown at the arranged positions of the QPSK symbol and IQ inverted symbol are the I component values and Q component values of the symbols.

The multiplexed signal of FIG. 9A and the multiplexed signal of FIG. 9B are affected by characteristics C(1, 1), C(2, 1), C(1, 2) and C(2, 2) of MIMO channel 30, and arrive at mobile station 20. Characteristics C(1, 1), C(2, 1), C(1, 2) and C(2, 2) for each timing of MIMO channel 30 are shown in FIG. 9C.

A radio signal in which the multiplexed signal of FIG. 9A and the multiplexed signal of FIG. 9B affected by characteristics C(1, 1) and C(2, 1) of MIMO channel 30 are present arrives at antenna 202-1 of mobile station 20. The received signal of antenna 202-1 is shown in FIG. 9D. The numbers in parentheses shown at the arranged positions of the symbols of the received signal of FIG. 9D are the I component value and Q component value of the symbols.

Further, a radio signal in which the multiplexed signal of FIG. 9A and the multiplexed signal of FIG. 9B affected by characteristics C(1, 2) and C(2, 2) of MIMO channel 30 are present arrives at antenna 202-2 of mobile station 20. The received signal of antenna 202-2 is shown in FIG. 9E. The numbers in parentheses shown at the arranged positions of the symbols of the received signal of FIG. 9E are the I component value and Q component value of the symbols.

Then, in mobile station 20, channel estimation section 223 performs channel estimation using the pilot symbol arranged in the portion of time t1 of the received signal of FIG. 9D, and obtains channel estimation values h(1, 1) and h(2, 1).

Further, average symbol generation section 227 combines the modulated data symbol of time t2 and the Q inverted symbol of time t3 to generate an average symbol for the subcarrier signal corresponding to subcarrier $f_1$ in the received signal of FIG. 9D. Furthermore, average symbol generation section 227 combines the modulated data symbol of time t4 and the Q inverted symbol of time t5 to generate an average symbol for the subcarrier signal corresponding to subcarrier $f_1$ in the received signal of FIG. 9D. Furthermore, average symbol generation section 227 combines the modulated data symbol of time t2 and the IQ inverted symbol of time t3 to generate an average symbol for the subcarrier signal corresponding to subcarrier $f_2$ in the received signal of FIG. 9D. Furthermore, average symbol generation section 227 combines the modulated data symbol of time t4 and the IQ inverted symbol of time t5 to generate an average symbol for the subcarrier signal corresponding to subcarrier $f_2$ in the received signal of FIG. 9D.

As shown in FIG. 9F, channel estimation values h(1, 1) and h(2, 1) and the average symbols generated by average symbol generation section 227 are inputted to channel estimation value correction section 225.

Channel estimation value correction section 225 regards the average symbols inputted from average symbol generation section 227 as BPSK modulated pilot symbols and performs channel estimation using the average symbols. The average symbols are regarded as BPSK modulated pilot symbols, and therefore there are two possibilities in channel estimation results depending on whether the BPSK symbol is (−1, 0) or (1, 0). Channel estimation value correction section 225 lines up channel estimation value candidates based on the possibilities. For example, for the average symbol of subcarrier $f_1$ and times t2 to t3, (1, 0.3) and (−1, −0.3) are lined up as channel estimation value candidates. The channel estimation value candidates lined up for each average symbol are shown in FIG. 9H.

Then, channel estimation value correction section 225 compares each candidate with the channel estimation value (the channel estimation value of time t1 in this illustration) obtained from the pilot symbol and selects the candidate having the value closest to the channel estimation value obtained from the pilot symbol (in other words, the value having a smaller square error with respect to the channel estimation value obtained from the pilot symbol).

For example, the above-described candidates (1, 0.3) and (−1, −0.3) correspond to subcarrier $f_1$ and therefore are compared with the channel estimation value (1, 0.3) corresponding to subcarrier $f_1$. As a result of comparison, candidate (1, 0.3) has a value having a smaller square error with respect to channel estimation value (1, 0.3) compared to (−1, −0.3), and therefore (1, 0.3) is selected. The selected candidate (1, 0.3) is determined as the channel estimation value h (1, 1) corresponding to times t2 to t3. The candidates encircled in FIG. 9H are the candidates selected as a result of the comparison. The determined channel estimation value is used for calculating the demultiplexing coefficients at demultiplexing coefficient calculation section 229.

Further, the same operation as that described above is performed in channel estimation section 224, average symbol generation section 228 and channel estimation value correction section 226.

That is, channel estimation section 224 performs channel estimation using the pilot symbol arranged in the portion of time t1 of the received signal of FIG. 9E, and obtains channel estimation values h(1, 2) and h(2, 2).

Further, average symbol generation section 228 combines the modulated data symbol of time t2 and the IQ inverted symbol of time t3 and generates an average symbol for the subcarrier signal corresponding to subcarrier $f_1$ in the received signal of FIG. 9E. Furthermore, average symbol generation section 228 combines the modulated data symbol of time t4 and the IQ inverted symbol of time t5 to generate an average symbol for the subcarrier signal corresponding to subcarrier $f_1$ in the received signal of FIG. 9E. Furthermore, average symbol generation section 228 combines the modulated data symbol of time t2 and the Q inverted symbol of time t3 to generate an average symbol for the subcarrier signal corresponding to subcarrier $f_2$ in the received signal of FIG. 9E. Furthermore, average symbol generation section 228 combines the modulated data symbol of time t4 and the Q inverted symbol of time t5 to generate an average symbol for the subcarrier signal corresponding to subcarrier $f_2$ in the received signal of FIG. 9E.

As shown in FIG. 9G, channel estimation values h(1, 2) and h(2, 2) obtained by channel estimation section 224 and the average symbols generated by average symbol generation section 228 are inputted to channel estimation value correction section 226.

Channel estimation value correction section 226 regards the average symbols inputted from average symbol generation section 228 as BPSK modulated pilot symbols and performs channel estimation using the average symbols. The average symbols are regarded as BPSK modulated pilot symbols, and therefore there are two possibilities in the channel estimation results depending on whether the BPSK symbol is (−1, 0) or (1, 0). Channel estimation value correction section 226 lines up channel estimation value candidates based on the possibilities. For example, for the average symbol of times t2 to t3 of subcarrier $f_1$, (0.5, 1) and (−0.5, −1) are lined up as channel estimation value candidates. The channel estimation value candidates lined up for each average symbol are shown in FIG. 9I.

Then, channel estimation value correction section 226 compares each candidate with the channel estimation value (the channel estimation value of time t1 in this illustration) obtained from the pilot symbol and selects the candidate having the value closest to the channel estimation value obtained from the pilot symbol.

For example, the candidates (0.5, 1) and (−0.5, −1) corresponding to times t2 to t3 of subcarrier $f_1$ are compared with channel estimation value (0.5, 1) corresponding to subcarrier $f_1$. As a result of comparison, candidate (0.5, 1) has a value closer to the channel estimation value (0.5, 1) compared to (−0.5, −1), and therefore (0.5, 1) is selected. The selected candidate (0.5, 1) is determined as channel estimation value h(1, 2) corresponding to times t2 to t3. The candidates encircled in FIG. 9I are the candidates selected as a result of the comparison. The determined channel estimation value is used for calculating demultiplexing coefficients at demultiplexing coefficient calculation section 229.

In this way, according to Embodiment 1, channel estimation using the average symbol obtained from a modulated data symbol and an inverted symbol corresponding to that symbol can be performed in mobile station 20, that is, pilot symbols as well as data symbols can be used for channel estimation. As a result, it is possible to increase the frequency at which channel estimation is performed, thereby improve channel estimation accuracy as well as reception error rate characteristics when the moving speed of mobile station 20 becomes fast.

Furthermore, in this embodiment, the case has been described where a radio transmission apparatus is applied to base station 10 and a radio reception apparatus is applied to mobile station 20, but the radio transmission apparatus may be applied to mobile station 20 and the radio reception apparatus may be applied to base station 10.

Further, in this embodiment, a repeated symbol is arranged by time division, but may be arranged in the frequency direction if within a coherent band.

Further, in this embodiment, the subcarrier for mapping the Q inverted symbol used for channel estimation value correction and the subcarrier for mapping the IQ inverted symbol not used for channel estimation value correction are made adjacent, non-adjacent subcarriers may also be used if within a coherent band.

Embodiment 2

Figure 10:
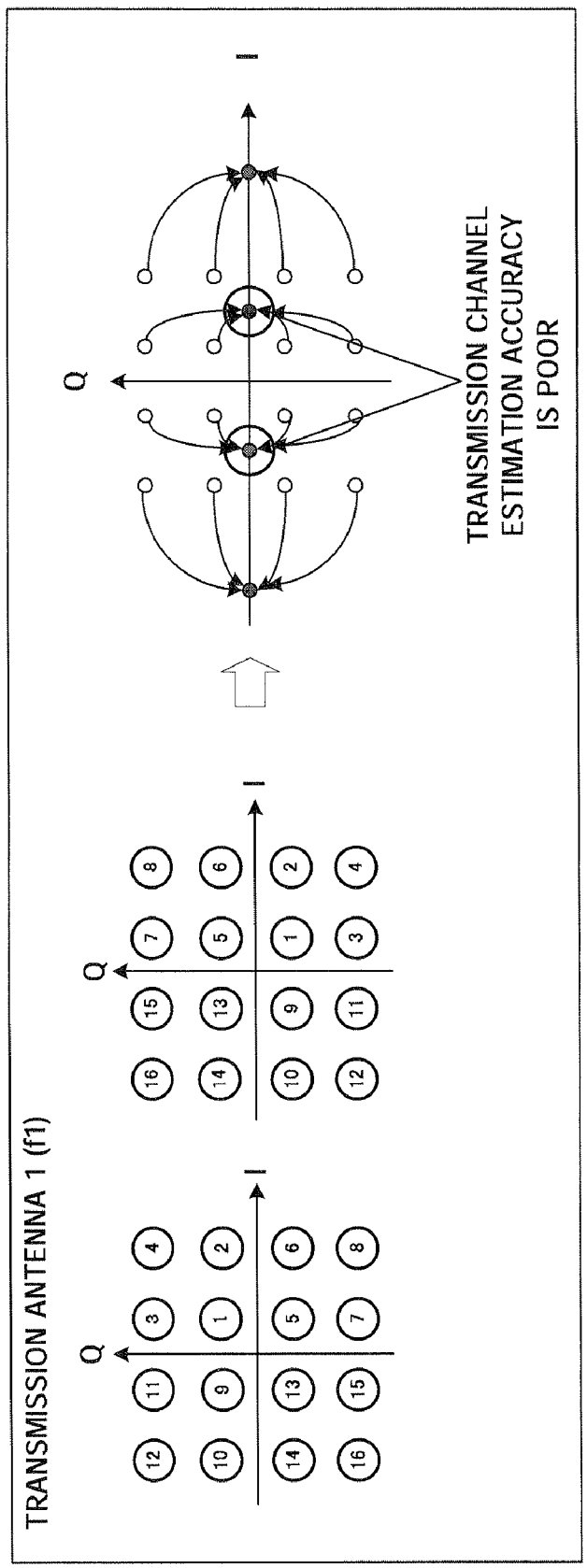
FIG. 10 shows the correspondence relationship between 16QAM symbols and Q inverted data symbols.

In Embodiment 1, the case has been described as an example where QPSK is applied as the modulation scheme. However, when the 16QAM is applied, as shown in FIG. 10, the average symbols of the modulated data symbols and Q inverted data symbols becomes four values on the I axis, and, out of the signal points of the four values, the signal points of the two values having smaller absolute values have low SNR, and therefore channel estimation accuracy deteriorates. Here, in Embodiment 2 of the present invention, a case will be described where 16QAM is applied as the modulation scheme.

Figure 11:
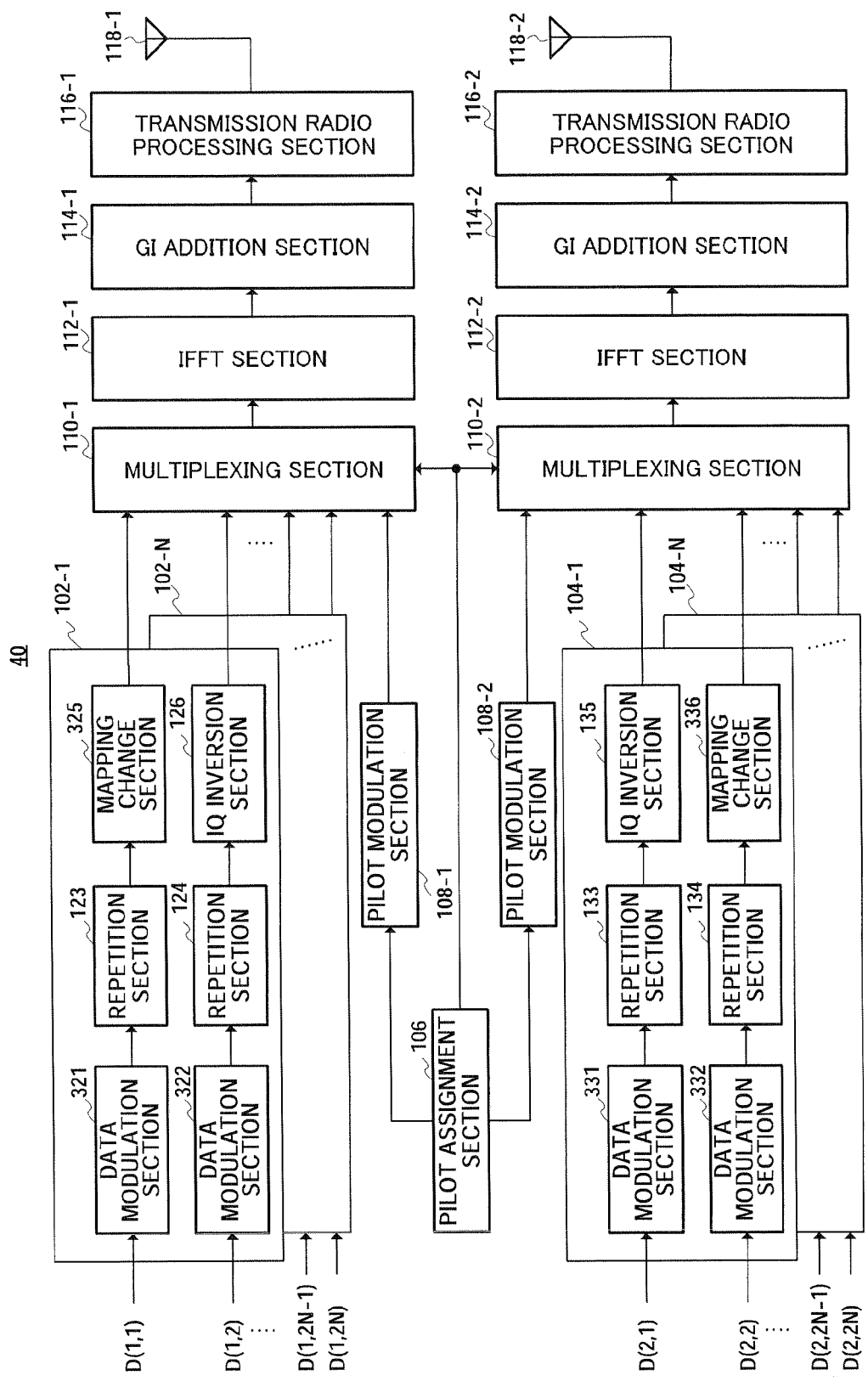
FIG. 11 is a block diagram showing a configuration of a base station according to Embodiment 2 of the present invention.

FIG. 11 is a block diagram showing a configuration of base station 40 according to Embodiment 2 of the present invention. The differences between FIG. 11 and FIG. 2 is that data modulation section 121 is changed to data modulation section 321, data modulation section 122 is changed to data modulation section 322, data modulation section 131 is changed to data modulation section 331, data modulation section 132 is changed to data modulation section 332, Q inversion section 125 is changed to mapping change section 325, and Q inversion section 136 is changed to mapping change section 336.

Data modulation section 321 modulates D(1, 2*n*−1) using 16QAM and generates a modulated data symbol. The modulated data symbol generated by data modulation section 321 is outputted to repetition section 123. Data modulation section 322 modulates D(1, 2*n*) and generates a modulated data symbol. The modulated data symbol generated by data modulation section 322 is outputted to repetition section 124.

Mapping change section 325 as a generation means of the radio transmission apparatus, outputs the modulated data symbol inputted from repetition section 123 as is to multiplexing section 110-1. Mapping change section 325 changes the mapping of the duplicate data symbol inputted after the modulated data symbol from repetition section 123 and generates a mapping change symbol. The generated mapping change symbol is outputted to multiplexing section 110-1 following the output of the modulated data symbol. This mapping change symbol corresponds to the modulated data symbol generated by data modulation section 321, and the average symbol obtained when the mapping change symbol is combined with this modulated data symbol is substantially the same as the BPSK modulated signal.

Data modulation section 331 modulates D(2, 2n−1) to generate a modulated data symbol. The modulated data symbol generated by data modulation section 331 is outputted to repetition section 133. Data modulation section 332 modulates D(2, 2n) using 16QAM and generates a modulated data symbol. The modulated data symbol generated by data modulation section 332 is outputted to repetition section 134.

Mapping change section 336 as a generation means of the radio transmission apparatus, outputs the modulated data symbol inputted from repetition section 134 as is to multiplexing section 110-2. Mapping change section 336 changes the mapping of the duplicate data symbol inputted after the modulated data symbol from repetition section 134 and generates a mapping change symbol. The generated mapping change symbol is outputted to multiplexing section 110-2 following the output of the modulated data symbol. This mapping change symbol corresponds to the modulated data symbol generated by data modulation section 332, and the average symbol obtained when the mapping change symbol is combined with this modulated data symbol is substantially the same as the BPSK modulated signal.

Here, the correspondence relationship between the 16QAM symbol and mapping change symbol will be explained with reference to FIG. 12. FIG. 12A shows the arrangement pattern of the modulated data symbols generated by data modulation sections 321 and 332. In this 16QAM symbol arrangement pattern, with regard to the quadrants on the right of the Q axis (first and fourth quadrants), the I component of each of the signal points takes two values, and mapping change sections 325 and 336 change the mapping by moving signal points symmetrically using the point on the I axis that indicates the average of these two values as the point of symmetry.

Similarly, for the quadrants on the left of the Q axis as well (second and third quadrants), mapping change sections 325 and 336 change the mapping by moving signal points symmetrically in the I component of the signal points using the point that indicates the average value obtained from the two values as the point of symmetry. By this means, the mapping change symbol arrangement pattern becomes that shown in FIG. 12B.

When the 16QAM symbols of FIG. 12A and the mapping change symbols of FIG. 12B are combined through averaging processing, average symbols of two values are obtained on the I axis, as shown in FIG. 12C. These average symbols are substantially the same as the BPSK modulated signal. That is, the average symbol combined by performing averaging processing on the mapping change symbol generated by mapping change section 325 and 336 and the corresponding 16QAM symbol is a signal of information of −1 or "1."

FIG. 13 summarizes the I components and Q components of the modulated data symbols, mapping change symbols and average symbols thereof. Furthermore, R in the figure indicates 0.3162. In this figure, it is clear that the average symbols are all 0 for the Q component, and the two values 4R and −4R for the I component.

Figure 14:
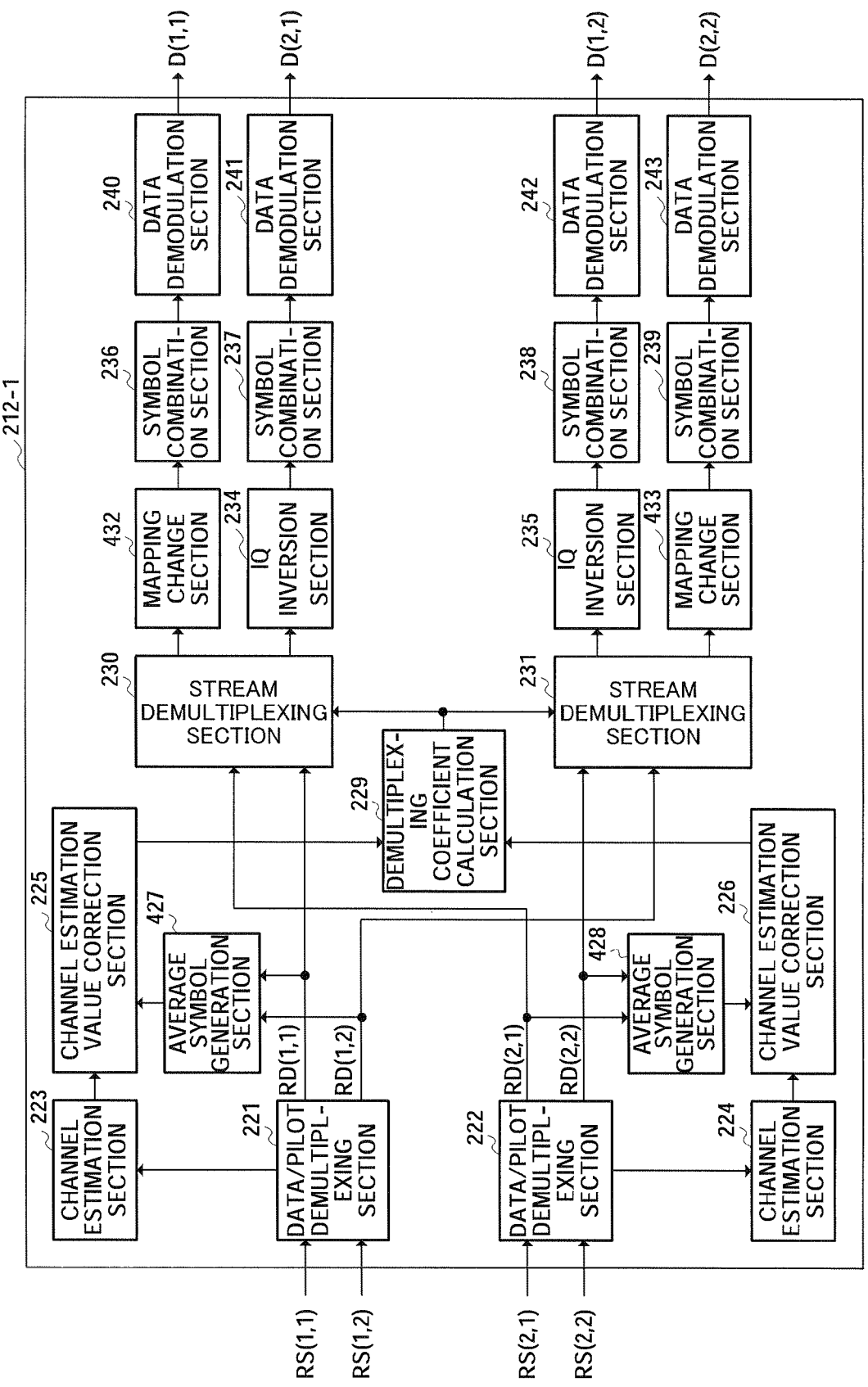
FIG. 14 is a block diagram showing the internal configuration of a MIMO reception section according to Embodiment 2 of the present invention.

The configuration of the mobile station according to Embodiment 2 of the present invention is the same as the configuration shown in FIG. 7 of Embodiment 1, and therefore FIG. 7 will be employed and a duplicate description thereof will be omitted. FIG. 14 is a block diagram showing an internal configuration of MIMO reception section 212 according to Embodiment 2 of the present invention. The differences between FIG. 14 and FIG. 8 is that average symbol generation section 227 is changed to average symbol generation section 427, average symbol generation section 228 is changed to average symbol generation section 428, Q inversion section 232 is changed to mapping change section 432, and Q inversion section 233 is changed to mapping change section 433.

Average symbol generation section 427 combines through averaging processing the portion corresponding to the modulated data symbol in RD(1, 2n−1) and the portion arranged at the position immediately after the portion, that is, the portion corresponding to the mapping change symbol. As a result, an average symbol is generated.

Further, average symbol generation section 427 combines through averaging processing the portion corresponding to the modulated data symbol in RD(1, 2n) and the portion arranged at the position immediately after the portion, that is, the portion corresponding to the mapping change symbol. As a result, an average symbol is generated. The generated average symbols are outputted to channel estimation value correction section 225.

Average symbol generation section 428 combines through averaging processing the portion corresponding to the modulated data symbol in RD(2, 2n−1) and the portion arranged at the position immediately after the portion, that is, the portion corresponding to the mapping change symbol. As a result, an average symbol is generated.

Further, average symbol generation section 428 combines through averaging processing the portion corresponding to the modulated data symbol in RD(2, 2n) and the portion arranged at the position immediately after the portion, that is, the portion corresponding to the mapping change symbol. As a result, an average symbol is generated. The generated average symbols are outputted to channel estimation value correction section 226.

Mapping change section 432 outputs the modulated data symbol in D(1, 2n−1) inputted from stream demultiplexing section 230 as is to symbol combination section 236. Further, mapping change section 432 changes the mapping of the mapping change symbol in D(1, 2n−1) inputted from stream demultiplexing section 230 in the same way as mapping change section 325 of FIG. 11 and restores the duplicate symbol. Then, mapping change section 432 outputs the restored duplicate symbol to symbol combination section 236 following the output of the modulated data symbol.

Mapping change section 433 outputs the modulated data symbol in D(2, 2n) inputted from stream demultiplexing section 231 as is to symbol combination section 239. Further, mapping change section 433 changes the mapping of the mapping change symbol in D(2, 2n) inputted from stream demultiplexing section 231 in the same way as mapping change section 336 of FIG. 11, and restores the duplicate symbol. Then, mapping change section 433 outputs the restored duplicate symbol to symbol combination section 239 following the output of the modulated data symbol.

In this way, according to Embodiment 2, in a 16QAM symbol arrangement pattern, by changing the mapping by symmetrically moving the signal points of the right quadrants and left quadrants centering around the Q axis of the IQ plane using the point that indicates the average value of the I component of two values of each of the signal points as the point of symmetry, two values for the average symbols can be obtained from the modulated data symbols and corresponding mapping change symbols even with the modulation scheme is 16QAM, and it is thereby possible to improve channel estimation accuracy and reception error rate characteristics by making the mobile station perform channel estimation using the average symbols.

Embodiment 3

In Embodiment 2, the case has been described where 16QAM is applied as the modulation scheme, but in Embodiment 3 of the present invention, a case will be described where 64QAM is applied as the modulation scheme. The configuration of the base station according to Embodiment 3 of the present invention is the same as the configuration shown in FIG. 11 of Embodiment 2, and therefore FIG. 11 will be employed, and the configuration of the mobile station according to Embodiment 3 of the present invention is the same as the configuration shown in FIG. 7 of Embodiment 1, and therefore FIG. 7 will be employed, and duplicate descriptions thereof will be omitted.

With reference to FIG. 11, data modulation section 321 modulates D(1, 2*n*–1) using 64QAM to generate a modulated data symbol. The modulated data symbol generated by data modulation section 321 is outputted to repetition section 123. Data modulation section 322 modulates D(1, 2*n*) to generate a modulated data symbol. The modulated data symbol generated by data modulation section 322 is outputted to repetition section 124.

Mapping change section 325 as a generation means of the radio transmission apparatus, outputs the modulated data symbol inputted from repetition section 123 as is to multiplexing section 110-1. Mapping change section 325 changes the mapping of the duplicate data symbol inputted after the modulated data symbol from repetition section 123 and generates a mapping change symbol. The generated mapping change symbol is outputted to multiplexing section 110-1 following the output of the modulated data symbol. This mapping change symbol corresponds to the modulated data symbol generated by data modulation section 321, and the average symbol obtained when the mapping change symbol is combined with this modulated data symbol is substantially the same as the BPSK modulated signal.

Data modulation section 331 modulates D(2, 2*n*–1) to generate a modulated data symbol. The modulated data symbol generated by data modulation section 331 is outputted to repetition section 133. Data modulation section 332 modulates D(2, 2*n*) using 64QAM to generate a modulated data symbol. The modulated data symbol generated by data modulation section 332 is outputted to repetition section 134.

Mapping change section 336 as a generation means of the radio transmission apparatus, outputs the modulated data symbol inputted from repetition section 134 as is to multiplexing section 110-2. Mapping change section 336 changes the mapping of the duplicate data symbol inputted after the modulated data symbol from repetition section 134 and generates a mapping change symbol. The generated mapping change symbol is outputted to multiplexing section 110-2 following the output of the modulated data symbol. This mapping change symbol corresponds to the modulated data symbol generated by data modulation section 332 and the average symbol obtained when the mapping change symbol is combined with this modulated data symbol is substantially the same as the BPSK modulated signal.

Figure 15A:
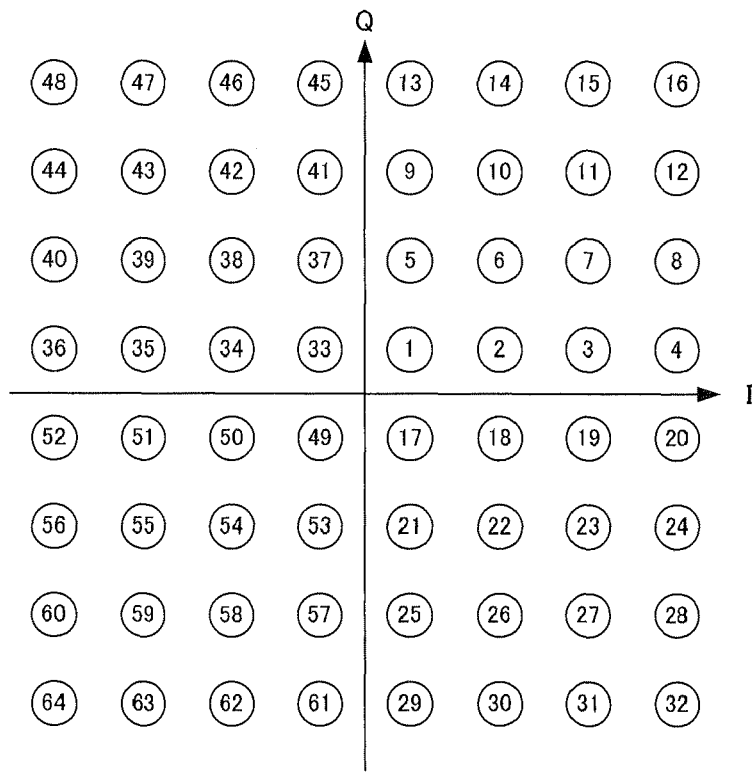
FIG. 15 shows the correspondence relationship between 64QAM symbols and mapping change symbols according to Embodiment 3 of the present invention.

Here, the correspondence relationship between the 64QAM symbols and mapping change symbols will be explained with reference to FIG. 15. FIG. 15A shows the arrangement pattern of the modulated data symbols generated by data modulation sections 321 and 332. In this 64QAM symbol arrangement pattern, with regard to the quadrants on the right of the Q axis (first and fourth quadrants), the I component of each of the signal points takes four values, and mapping change sections 325 and 336 change the mapping by moving signal points symmetrically using the point on the I axis that indicates the average of these four values as the point of symmetry.

Similarly, for the quadrants on the left of the Q axis as well (second and third quadrants), mapping change sections 325 and 336 change the mapping by moving signal points symmetrically in the I component of each of the signal points using the point that indicates the average value obtained from the four values as the point of symmetry. By this means, the mapping change symbol arrangement pattern becomes that shown in FIG. 15B.

Figure 15B:
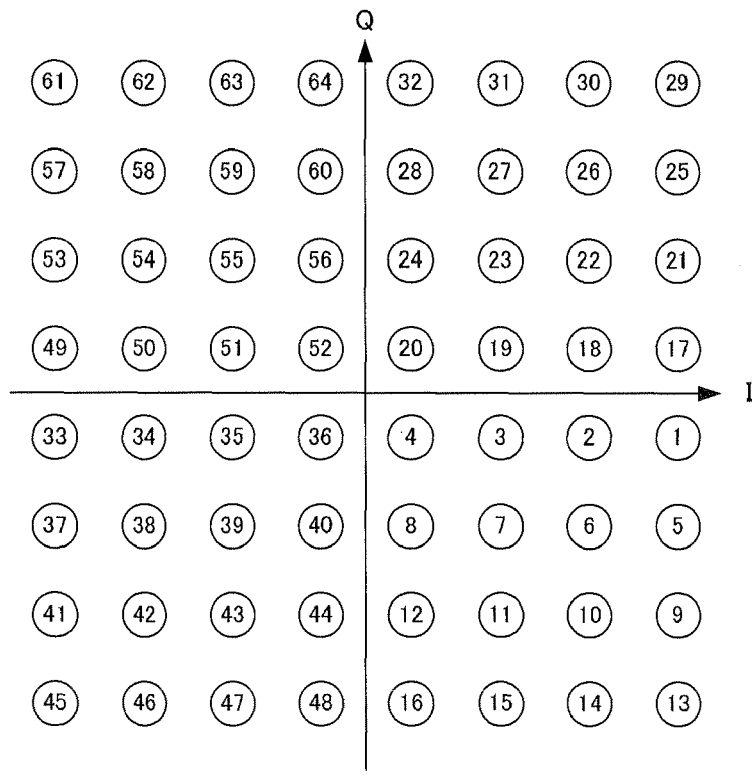

When the 64QAM symbols of FIG. 15A and the mapping change symbols of FIG. 15B are combined through averaging processing, average symbols of two values are obtained on the I axis. These average symbols are substantially the same as the BPSK modulated signal. That is, the average symbol combined by performing averaging processing on the mapping change symbol generated by mapping change section 325 and 336 and the corresponding 64QAM symbol is a signal of information of "–1" or "1."

FIG. 16 summarizes the I components and Q components of the modulated data symbols, mapping change symbols and average symbols thereof. Furthermore, R in the figure indicates 0.154. In this figure, it is clear that the average symbols are all 0 for the Q component, and the two values 8R and –8R for the I component.

In this way, according to Embodiment 3, in a 64QAM symbol arrangement pattern, by changing the mapping by symmetrically moving the signal points of the right quadrants and left quadrants centering around the Q axis of the IQ plane using the point that indicates the average value of the I component of four values of each of the signal points as the point of symmetry, two values for the average symbols can be obtained from the modulated data symbols and corresponding mapping change symbols even with the 64QAM modulation scheme, and it is thereby possible to improve channel estimation accuracy and reception error rate characteristics by making the mobile station perform channel estimation using the average symbols.

Embodiment 4

In Embodiments 1 to 3, the case has been described where QPSK, 16QAM and 64QAM are applied as modulation schemes, but, in this embodiment, a case will be described where 8PSK is applied as the modulation scheme. The configuration of the base station according to Embodiment 4 of the present invention is the same as the configuration shown in FIG. 11 of Embodiment 2, and therefore FIG. 11 will be employed, and the configuration of the mobile station according to Embodiment 4 of the present invention is the same as the configuration shown in FIG. 7 of Embodiment 1, and therefore FIG. 7 will be employed, and duplicate descriptions thereof will be omitted.

With reference to FIG. 11, data modulation section 321 modulates D(1, 2*n*–1) using 8PSK to generate a modulated data symbol. The modulated data symbol generated by data modulation section 321 is outputted to repetition section 123. Data modulation section 322 modulates D(1, 2*n*) to generate a modulated data symbol. The modulated data symbol generated by data modulation section 322 is outputted to repetition section 124.

Mapping change section 325 as a generation means of the radio transmission apparatus, outputs the modulated data symbol inputted from repetition section 123 as is to multiplexing section 110-1. Mapping change section 325 changes the mapping of the duplicate data symbol inputted after the modulated data symbol from repetition section 123 and generates a mapping change symbol. The generated mapping change symbol is outputted to multiplexing section 110-1 following the output of the modulated data symbol. This mapping change symbol corresponds to the modulated data symbol generated by data modulation section 321, and the average symbol obtained when the mapping change symbol is combined with this modulated data symbol is substantially the same as the BPSK modulated signal.

Data modulation section 331 modulates D(2, 2n−1) to generate a modulated data symbol. The modulated data symbol generated by data modulation section 331 is outputted to repetition section 133. Data modulation section 332 modulates D(2, 2n) using 8PSK to generate a modulated data symbol. The modulated data symbol generated by data modulation section 332 is outputted to repetition section 134.

Mapping change section 336 as a generation means of the radio transmission apparatus, outputs the modulated data symbol inputted from repetition section 134 as is to multiplexing section 110-2. Mapping change section 336 changes the mapping of the duplicate data symbol inputted after the modulated data symbol from repetition section 134 and generates a mapping change symbol. The generated mapping change symbol is outputted to multiplexing section 110-2 following the output of the modulated data symbol. This mapping change symbol corresponds to the modulated data symbol generated by data modulation section 332, and the average symbol obtained when the mapping change symbol is combined with this modulated data symbol is substantially the same as the BPSK modulated signal.

Here, the correspondence relationship between the 8PSK symbols and mapping change symbols will be explained with reference to FIG. 17. FIG. 17A shows the arrangement pattern of the modulated data symbols generated by data modulation sections 321 and 332. In this 8PSK symbol arrangement pattern, with regard to the quadrants on the right of the Q axis (first and fourth quadrants), the I component of each of the signal points takes two values, and mapping change sections 325 and 336 change the mapping by moving signal points symmetrically using the point on the I axis that indicates the average of these two values as the point of symmetry.

Similarly, for the quadrants on the left of the Q axis as well (second and third quadrants), mapping change sections 325 and 336 change the mapping by moving signal points symmetrically in the I component of each of the signal points using the point that indicates the average value obtained from the two values as the point of symmetry. By this means, the mapping change symbol arrangement pattern becomes that shown in FIG. 17B.

Figure 17B:
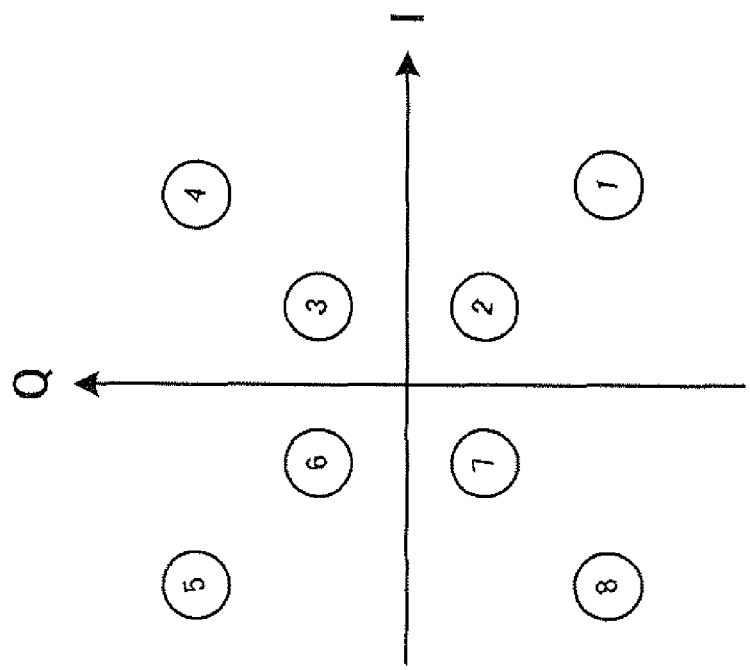
FIG. 17 shows the correspondence relationship between 8PSK symbols and mapping change symbols according to Embodiment 4 of the present invention.
Figure 17A:
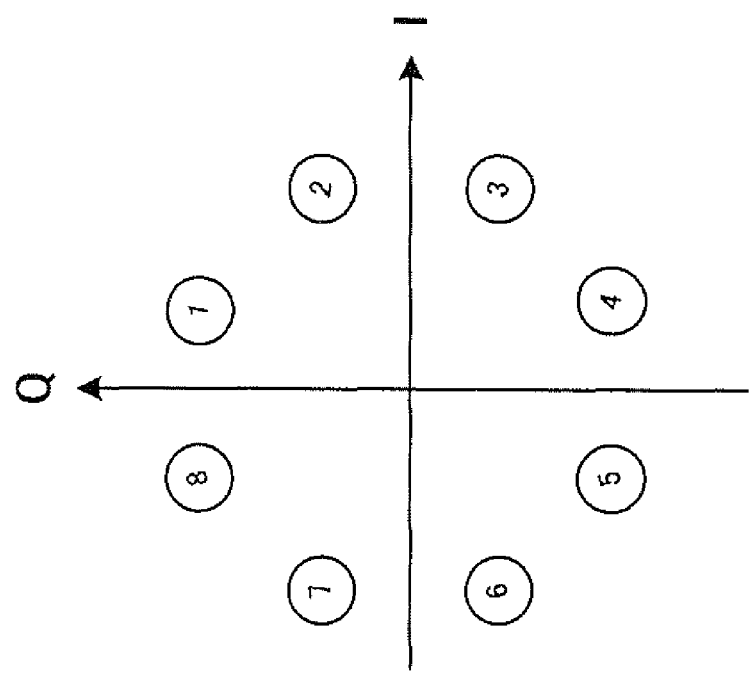

When the 8PSK symbols of FIG. 17A and the mapping change symbols of FIG. 17B are combined through averaging processing, average symbols of two values are obtained on the I axis. These average symbols are substantially the same as the BPSK modulated signal. That is, the average symbol combined by performing averaging processing on the mapping change symbol generated by mapping change section 325 and 336 and the corresponding 8PSK symbol is a signal of information of "−1" or "1."

FIG. 18 summarizes the I components and Q components of the modulated data symbols, mapping change symbols and average symbols thereof. In this figure, it is clear that the average symbols are all Q for the Q component, and the two values 1.307 and −1.307 for the I component.

In this way, according to Embodiment 4, in an 8PSK symbol arrangement pattern, by changing the mapping by symmetrically moving the signal points of the right quadrants and left quadrants centering around the Q axis of the IQ plane using the point that indicates the average value of the I component of two values of each of the signal points as the point of symmetry, two values for the average symbols can be obtained from the modulated data symbols and corresponding mapping change symbols even with the 8PSK modulation scheme, and it is thereby possible to improve channel estimation accuracy and reception error rate characteristics by making the mobile station perform channel estimation using the average symbols.

Embodiment 5

In Embodiment 4, the case has been described where 8PSK is applied as the modulation scheme, but, in Embodiment 5 of the present invention, a case will be described where 16PSK is applied as the modulation scheme. The configuration of the base station according to Embodiment 5 of the present invention is the same as the configuration shown in FIG. 11 of Embodiment 2, and therefore FIG. 11 will be employed, and the configuration of the mobile station according to Embodiment 5 of the present invention is the same as the configuration shown in FIG. 7 of Embodiment 1, and therefore FIG. 7 will be employed, and duplicate descriptions thereof will be omitted.

With reference to FIG. 11, data modulation section 321 modulates D(1, 2n−1) using 16PSK to generate a modulated data symbol. The modulated data symbol generated by data modulation section 321 is outputted to repetition section 123. Data modulation section 322 modulates D(1, 2n) to generate a modulated data symbol. The modulated data symbol generated by data modulation section 322 is outputted to repetition section 124.

Mapping change section 325 as a generation means of the radio transmission apparatus, outputs the modulated data symbol inputted from repetition section 123 as is to multiplexing section 110-1. Mapping change section 325 changes the mapping of the duplicate data symbol inputted after the modulated data symbol from repetition section 123 and generates a mapping change symbol. The generated mapping change symbol is outputted to multiplexing section 110-1 following the output of the modulated data symbol. This mapping change symbol corresponds to the modulated data symbol generated by data modulation section 321, and the average symbol obtained when the mapping change symbol is combined with this modulated data symbol is substantially the same as the four-value AM modulated signal.

Data modulation section 331 modulates D(2, 2n−1) to generate a modulated data symbol. The modulated data symbol generated by data modulation section 331 is outputted to repetition section 133. Data modulation section 332 modulates D(2, 2n) using 16PSK to generate a modulated data symbol. The modulated data symbol generated by data modulation section 332 is outputted to repetition section 134.

Mapping change section 336 as a generation means of the radio transmission apparatus, outputs the modulated data symbol inputted from repetition section 134 as is to multiplexing section 110-2. Mapping change section 336 changes the mapping of the duplicate data symbol inputted after the modulated data symbol from repetition section 134 and generates a mapping change symbol. The generated mapping change symbol is outputted to multiplexing section 110-2 following the output of the modulated data symbol. This mapping change symbol corresponds to the modulated data symbol generated by data modulation section 332, and the average symbol obtained when the mapping change symbol is combined with this modulated data symbol is substantially the same as the four-value AM modulated signal.

Here, the correspondence relationship between the 16PSK symbol and mapping change symbol will be explained with reference to FIG. 19. FIG. 19A shows the arrangement pattern of the modulated data symbols generated by data modulation sections 321 and 332. In this 16PSK symbol arrangement pattern, with regard to the quadrants on the right of the Q axis (first and fourth quadrants), the I component of each of the signal points takes four values, and mapping change sections 325 and 336 change the mapping by moving signal points symmetrically using the point on the I axis that indicates the average of these four values as the point of symmetry.

Similarly, for the quadrants on the left of the Q axis as well (second and third quadrants), mapping change sections 325 and 336 change the mapping by moving signal points symmetrically in the I component of each of the signal points using the point that indicates the average value obtained from the two values as the point of symmetry. By this means, the mapping change symbol arrangement pattern becomes that shown in FIG. 19B.

Figure 19B:
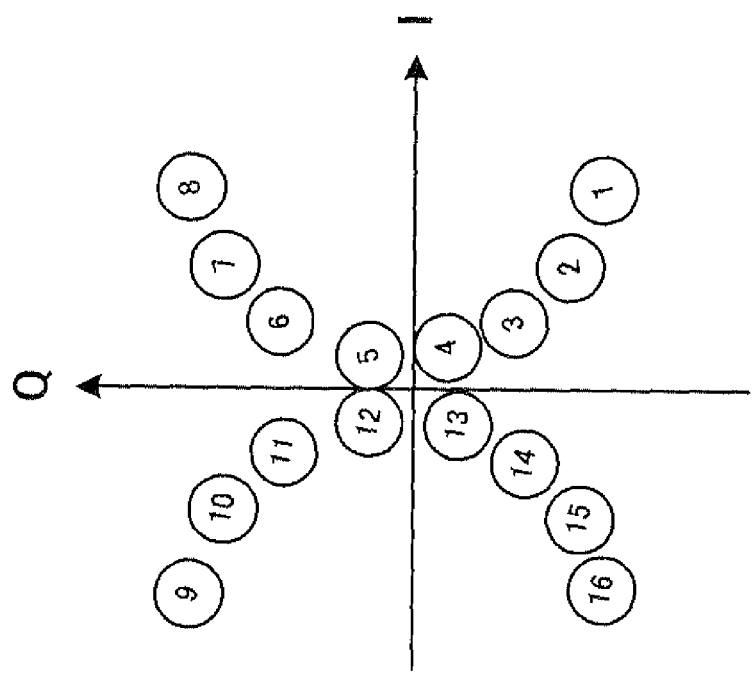
FIG. 19 shows the correspondence relationship between 16PSK symbols and mapping change symbols according to Embodiment 5 of the present invention.
Figure 19A:
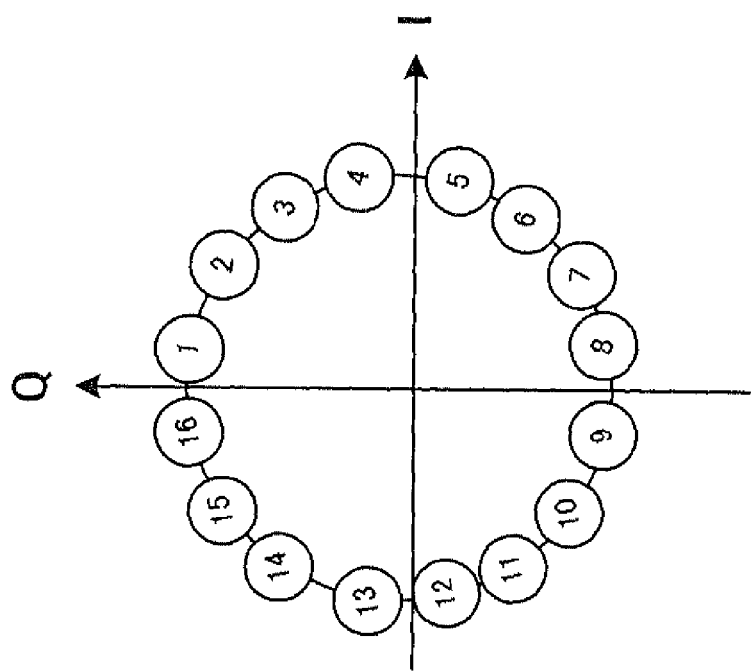

When the 16PSK symbols of FIG. 19A and the mapping change symbols of FIG. 19B are combined through averaging processing, four average symbol values are obtained on the I axis.

FIG. 20 summarizes the I components and Q components of the modulated data symbols, mapping change symbols and average symbols thereof. In this figure, it is clear that the average symbols are all 0 for the Q component, and the four values 1.176, 1.387, −1.176, and −1.387 for the I component.

In this way, according to Embodiment 5, in a 16PSK symbol arrangement pattern, by changing the mapping by symmetrically moving the signal points of the right quadrants and left quadrants centering around the Q axis of the IQ plane using the point that indicates the average value of the I component of four values of each of the signal points as the point of symmetry, four values for the average symbols can be obtained from the modulated data symbols and the corresponding mapping change symbols even with the 16PSK modulation scheme, and it is thereby possible to improve channel estimation accuracy and reception error rate characteristics by making the mobile station perform channel estimation using the average symbols.

Embodiment 6

In Embodiment 2, the case has been described where 16QAM is applied as the modulation scheme and channel estimation is performed using average symbols of two values obtained by combining modulated data symbols and mapping change symbols, but, in Embodiment 6 of the present invention, a case will be described where channel estimation is performed using average symbols of one value.

Figure 21:
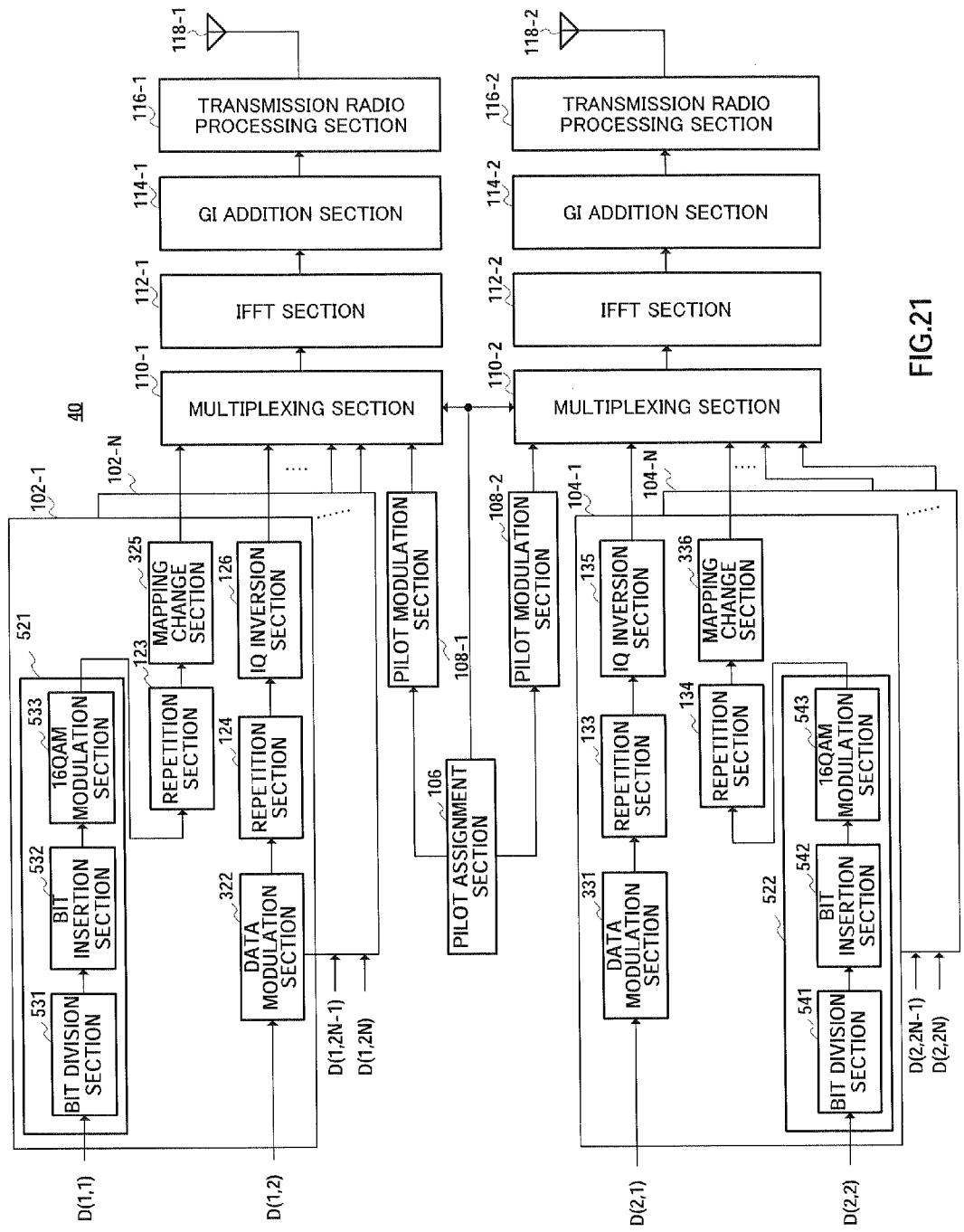
FIG. 21 is a block diagram showing a configuration of a base station according to Embodiment 6 of the present invention.

FIG. 21 is a block diagram showing a configuration of the base station according to Embodiment 6 of the present invention. The differences between FIG. 21 and FIG. 11 are that bit division section 531, bit insertion section 532 and 16QAM modulation section 533 are added to data modulation section 321 to be data modulation section 521, and bit division section 541, bit insertion section 542 and 16QAM modulation section 543 are added to data modulation section 322 to be data modulation section 522.

In FIG. 21, bit division section 531 divides inputted D(1, 2n−1) per three bits, and outputs the signal sequences divided into three bits to bit insertion section 532.

Bit insertion section 532 inserts 0 at the head of each signal sequence divided into three bits and outputted from bit division section 531, and outputs each signal sequence of four bits with 0 at the head to 16QAM modulation section 533.

16QAM modulation section 533 modulates using 16QAM each signal sequence of four bits outputted from bit insertion section 532 and generates a modulated data symbol. The modulated data symbol generated by 16QAM modulation section 533 is outputted to repetition section 123.

Mapping change section 325 as a generation means of the radio transmission apparatus, outputs the modulated data symbol inputted from repetition section 123 as is to multiplexing section 110-1. Mapping change section 325 changes the mapping of the duplicate data symbol inputted after the modulated data symbol from repetition section 123 and generates a mapping change symbol. The generated mapping change symbol is outputted to multiplexing section 110-1 following the output of the modulated data symbol. This mapping change symbol corresponds to the modulated data symbol generated by data modulation section 321.

Bit division section 541 divides inputted D(2, 2n) per three bits, and outputs the signal sequences divided into three bits to bit insertion section 542.

Bit insertion section 542 inserts 0 at the head of each signal sequence divided into three bits and outputted from bit division section 541, and outputs each signal sequence of four bits with 0 at the head to 16QAM modulation section 543.

16QAM modulation section 543 modulates using 16QAM each signal sequence of four bits outputted from bit insertion section 542 to generate a modulated data symbol. The modulated data symbol generated by 16QAM modulation section 543 is outputted to repetition section 134.

Mapping change section 336 as a generation means of the radio transmission apparatus, outputs the modulated data symbol inputted from repetition section 134 as is to multiplexing section 110-2. Mapping change section 336 changes the mapping of the duplicate data symbol inputted after the modulated data symbol from repetition section 134 and generates a mapping change symbol. The generated mapping change symbol is outputted to multiplexing section 110-2 following the output of the modulated data symbol. This mapping change symbol corresponds to the modulated data symbol generated by data modulation section 332.

Here, the correspondence relationship between the 16QAM symbol which always has 0 at the head of the signal sequence of four bits, and the mapping change symbol will be explained with reference to FIG. 22. FIG. 22A shows the arrangement pattern of the modulated data symbols generated by data modulation sections 321 and 332. In this 16QAM symbol arrangement pattern, the I component of each of the signal points takes two values, and mapping change sections 325 and 336 change the mapping by moving signal points symmetrically using the point on the I axis that indicates the average of these two values as the point of symmetry. By this means, the mapping change symbol arrangement pattern becomes that shown in FIG. 22B.

When the 16QAM symbols of FIG. 22A and the mapping change symbols of FIG. 22B are combined through averaging processing, average symbols of one value are obtained on the I axis as shown in FIG. 22C.

FIG. 23 summarizes the I components and Q components of the modulated data symbols, mapping change symbols and average symbols thereof. Furthermore, R in the figure indicates 0.3162. In this figure, it is clear that the average symbols are all 0 for the Q component, and the single value 4R for the I component.

Figure 24:
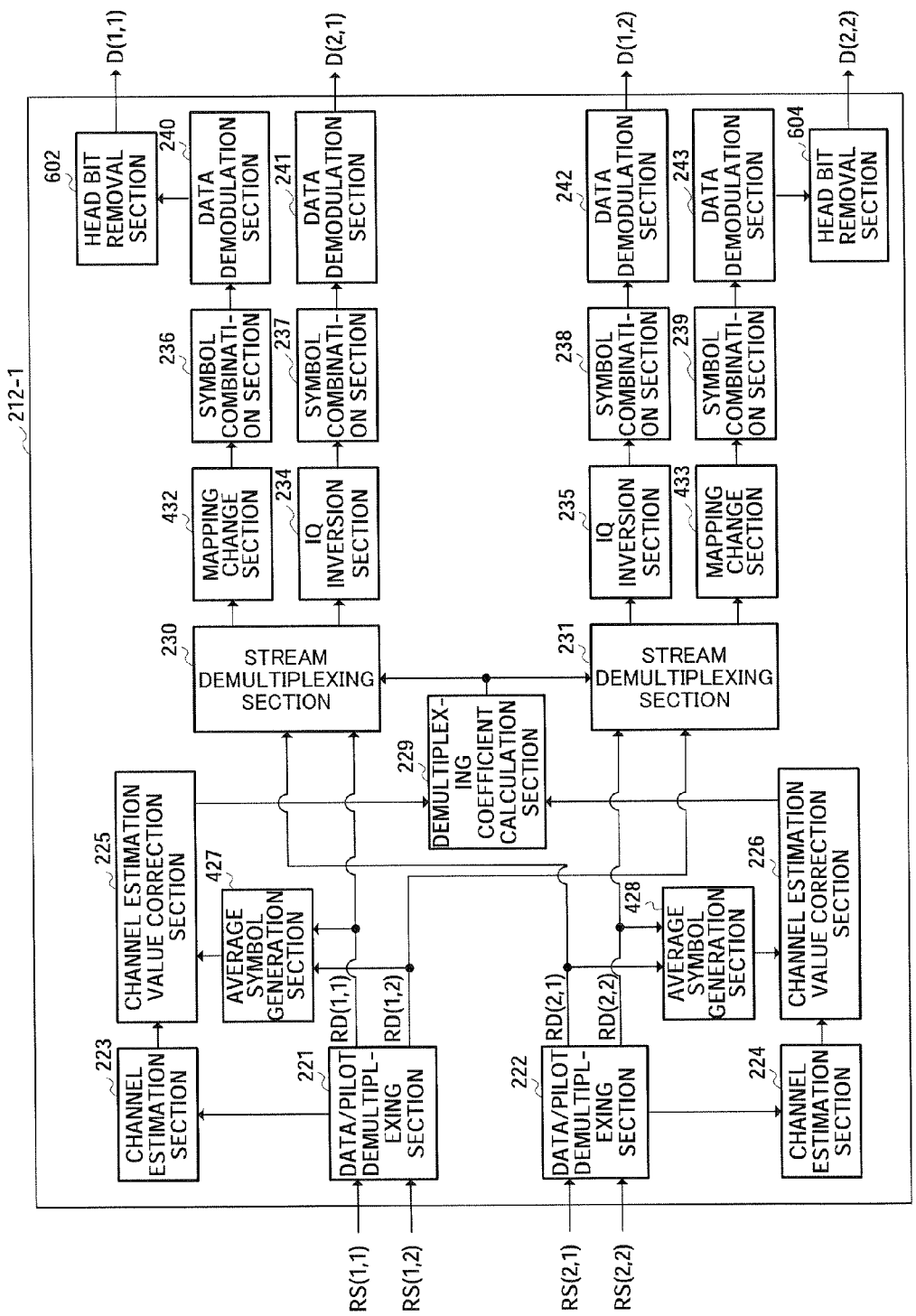
FIG. 24 is a block diagram showing a configuration of a MIMO reception section according to Embodiment 6 of the present invention.

FIG. 24 is a block diagram showing a configuration of MIMO reception section 212-1 according to Embodiment 6 of the present invention. The difference between FIG. 24 and FIG. 14 are that head bit removal sections 602 and 604 are added.

Head bit removal section 602 removes the head bit 0 of each signal sequence of four bits superimposed on each symbol, out of signal sequences outputted from data demodulation section 240 and then outputs the signal sequence of three bits from which the head bit 0 is removed.

Similarly, head bit removal section 604 outputs the signal sequences outputted from data demodulation section 243 with the head bits removed.

In this way, according to Embodiment 6, in a 16QAM symbol arrangement pattern having signal sequences with 0 at the head, by changing the mapping by symmetrically moving the signal points using the point that indicates the average value of the I component of two values of each of the signal points as the point of symmetry, one value for the average symbols can be obtained from the modulated data symbols and the corresponding mapping change symbols, and it is thereby possible to improve channel estimation accuracy and reception error rate characteristics by making the mobile station perform channel estimation using the average symbols.

Figure 25:
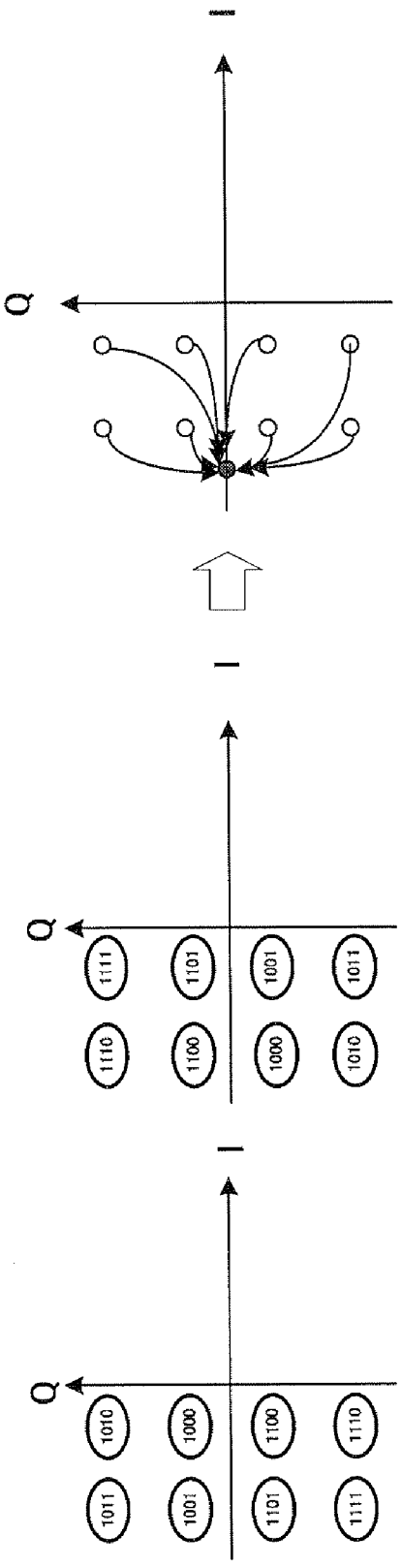
FIG. 25 shows the correspondence relationship between 16QAM symbols and mapping change symbols according to Embodiment 6 of the present invention.

Furthermore, in this embodiment, the case has been described where 0 is inserted at the head and modulation is performed, but the present invention is not limited to this, and, the present invention can be similarly applied to a case where 1 is inserted at the head and modulation is performed. FIG. 25 shows the correspondence relationship between the 16QAM symbol and mapping change symbol at this time, and FIG. 26 shows the I components and Q components of the modulated data symbols, mapping change symbols and average symbols thereof.

Further, each function block employed in the description of each of the aforementioned embodiments may typically be implemented as an LSI constituted by an integrated circuit. These may be individual chips or partially or totally contained on a single chip.

Furthermore, here, each function block is described as an LSI, but this may also be referred to as "IC", "system LSI", "super LSI", "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application in biotechnology is also possible.

The present application is based on Japanese Patent Application No. 2004-376162, filed on Dec. 27, 2004 and Japanese Patent Application No. 2005-263014, filed on Sep. 9, 2005, the entire content of which is expressly incorporated by reference herein.

INDUSTRIAL APPLICABILITY

The radio transmission apparatus, radio reception apparatus, radio transmission method and radio reception method of the present invention can be applied to apparatuses such as a base station apparatus and a mobile station apparatus in a radio communication network system where a plurality of streams are transmitted in parallel.

The invention claimed is:

1. A radio transmission apparatus comprising:
    a modulation section that modulates a data signal that has zero or one inserted at the head of a data signal superimposed on one modulation symbol using a predetermined modulation scheme to obtain a modulation symbol;
    a generation section that generates an inverted symbol inverting positive/negative signs of a value of an I component and a value of a Q component of the modulation symbol or generates a mapping change symbol by, in right quadrants or left quadrants on a Q axis on an IQ plane in which the modulation symbol is mapped, symmetrically moving the modulation symbol centering around a point of symmetry that indicates an average value of the I component of each adoptable signal point in the predetermined modulation scheme; and
    a multiplexing section that multiplexes the modulation symbol, and the inverted symbol or the mapping change symbol to obtain a multiplexed signal.

2. The radio transmission apparatus according to claim 1, further comprising a known signal generation section that generates a known signal of a pilot signal and a zero signal.

3. The radio transmission apparatus according to claim 2, wherein the generation section generates the inverted symbol in case where the zero signal is generated and generates the mapping change symbol in case where the pilot signal is generated.

4. The radio transmission apparatus according to claim 2, wherein the multiplexing section time division multiplexes or frequency multiplexes the known signal, the modulation symbol, and the inverted symbol or the mapping change symbol to generate the multiplexed signal.

5. The radio transmission apparatus according to claim 2, further comprising:
    a plurality of antennas;
    an assignment section that assigns a first multiplexed signal, which results from a first data signal, to any subcarrier of a plurality of subcarriers, and assigns a second multiplexed signal, which results from a second data signal and upon which a known signal different from a known signal multiplexed upon the first multiplexed signal is multiplexed, to another subcarrier of the plurality of subcarriers; and
    a transmission section that transmits both the first multiplexed signal assigned to the any subcarrier and the second multiplexed signal assigned to the other subcarrier from any antenna of the plurality of antennas.

6. The radio transmission apparatus according to claim 2, further comprising:
    a plurality of antennas;
    an assignment section that assigns both a first multiplexed signal, which results from a first data signal, and a second multiplexed signal, which results from a second data signal and upon which a known signal different from a known signal multiplexed upon the first multiplexed signal is multiplexed, to any subcarrier of a plurality of subcarriers; and
    a transmission section that transmits the first multiplexed signal from any antenna of the plurality of antennas, and the second multiplexed signal from another antenna of the plurality of antennas.

7. The radio transmission apparatus according to claim 2, further comprising:
    a plurality of antennas;
    an assignment section that assigns a first multiplexed signal, which results from a first data signal, to any subcarrier of a plurality of subcarriers, and assigns a second multiplexed signal, which results from a second data signal and upon which a known signal that is the same as a known signal multiplexed upon the first multiplexed signal is multiplexed, to another subcarrier of the plurality of subcarriers; and a transmission section that transmits the first multiplexed signal assigned to the any subcarrier from any antenna of the plurality of antennas, and the second multiplexed signal assigned to the other subcarrier from another antenna of the plurality of antennas.

8. The radio transmission apparatus according to claim 1, wherein, in the right quadrants or the left quadrants on the Q axis on the IQ plane in which the modulation symbol is mapped, when the predetermined modulation scheme is 16 QAM, the generation section generates the mapping change symbol by symmetrically moving the modulation symbol centering around the point of symmetry that indicates the average value of the I component of two values of each adoptable signal point of a 16 QAM modulation symbol.

9. The radio transmission apparatus according to claim 1, wherein, in the right quadrants or the left quadrants on the Q axis on the IQ plane in which the modulation symbol is mapped, when the predetermined modulation scheme is 64 QAM, the generation section generates the mapping change symbol by symmetrically moving the modulation symbol centering around the point of symmetry that indicates the average value of the I component of four values of each adoptable signal point of a 64 QAM modulation symbol.

10. The radio transmission apparatus according to claim 1, wherein, in the right quadrants or the left quadrants on the Q axis on the IQ plane in which the modulation symbol is mapped, when the predetermined modulation scheme is 8 PSK, the generation section generates the mapping change symbol by symmetrically moving the modulation symbol centering around the point of symmetry that indicates the average value of the I component of two values of each adoptable signal point of an 8 PSK modulation symbol.

11. The radio transmission apparatus according to claim 1, wherein, in the right quadrants or the left quadrants on the Q axis on the IQ plane in which the modulation symbol is mapped, when the predetermined modulation scheme is 16 PSK, the generation section generates the mapping change symbol by symmetrically moving the modulation symbol centering around the point of symmetry that indicates the average value of the I component of four values of each adoptable signal point of a 16 PSK modulation symbol.

12. A radio reception apparatus comprising:
a reception section that receives a multiplexed signal in which a modulation symbol, and an inverted symbol or a mapping change symbol are multiplexed, the modulation symbol being obtained by modulating a data signal that has zero or one inserted at the head of a data signal superimposed on one modulation symbol using a predetermined modulation scheme, the inverted symbol inverting positive/negative signs of a value of an I component and a value of a Q component of the modulation symbol and the mapping change symbol being obtained by, in right quadrants or left quadrants on a Q axis on an IQ plane in which the modulation symbol is mapped, symmetrically moving the modulation symbol centering around a point of symmetry that indicates an average value of the I component of each adoptable signal point in the predetermined modulation scheme;

an extraction section that extracts the modulation symbol, and the inverted symbol or the mapping change symbol, from the multiplexed signal;

a generation section that generates a combined signal comprised of the modulation symbol, and the inverted symbol or the mapping change symbol, and an estimation section that performs channel estimation based on the combined signal.

13. The radio reception apparatus according to claim 12, wherein the estimation section performs channel estimation using a known signal extracted from the multiplexed signal by the extraction section to obtain a first channel estimation value, and performs channel estimation using the combined signal and the first channel estimation value to obtain a second channel estimation value which is different from the first channel estimation value.

14. The radio reception apparatus according to claim 13, wherein the estimation section performs channel estimation using the combined signal to obtain a plurality of candidates of the second channel estimation value and determines as the second channel estimation value the candidate of the plurality of candidates that has a smallest square error with respect to the first channel estimation value.

15. A radio transmission method comprising:
modulating a data signal that has zero or one inserted at the head of a data signal superimposed on one modulation symbol using a predetermined modulation scheme to obtain a modulation symbol;

generating an inverted symbol inverting positive/negative signs of a value of an I component and a value of a Q component of the modulation symbol or generating a mapping change symbol by, in right quadrants or left quadrants on Q axis on an IQ plane in which the modulation symbol is mapped, symmetrically moving the modulation symbol centering around a point of symmetry that indicates an average value of the I component of each adoptable signal point in the predetermined modulation scheme; and multiplexing the modulation symbol, and the inverted symbol or the mapping change symbol to obtain a multiplexed signal.

16. A radio reception method comprising:
receiving a multiplexed signal in which a modulation symbol, and an inverted symbol or a mapping change symbol are multiplexed, the modulation symbol being obtained by modulating a data signal that has zero or one inserted at the head of a data signal superimposed on one modulation symbol using a predetermined modulation scheme, the inverted symbol inverting positive/negative signs of a value of an I component and a value of a Q component of the modulation symbol and the mapping change symbol being obtained by, in right quadrants or left quadrants on a Q axis on an IQ plane in which the modulation symbol is mapped, symmetrically moving the modulation symbol centering around a point of symmetry that indicates an average value of the I component of each adoptable signal point in the predetermined modulation scheme;

extracting the modulation symbol, and the inverted symbol or the mapping change symbol, from the multiplexed signal;

generating a combined signal comprised of the modulation symbol, and the inverted symbol or the mapping change symbol; and performing channel estimation based on the combined signal.

* * * * *